(12) United States Patent
Mazyck et al.

(10) Patent No.: US 11,911,727 B2
(45) Date of Patent: Feb. 27, 2024

(54) MAGNETIC ADSORBENTS, METHODS FOR MANUFACTURING A MAGNETIC ADSORBENT, AND METHODS OF REMOVAL OF CONTAMINANTS FROM FLUID STREAMS

(71) Applicant: Carbonxt, Inc., Gainesville, FL (US)

(72) Inventors: David W. Mazyck, Gainesville, FL (US); Regina Rodriguez, Gainesville, FL (US); Christine Valcarce, Gainesville, FL (US)

(73) Assignee: Carbonxt, Inc., Gainesville, FL (US)

(*) Notice: Subject to any disclaimer, the term of this patent is extended or adjusted under 35 U.S.C. 154(b) by 1722 days.

(21) Appl. No.: 14/922,031

(22) Filed: Oct. 23, 2015

(65) Prior Publication Data

US 2021/0178325 A1    Jun. 17, 2021

Related U.S. Application Data

(63) Continuation-in-part of application No. 14/349,636, filed as application No. PCT/US2013/026863 on Feb. 20, 2013, now abandoned.

(60) Provisional application No. 61/660,475, filed on Jun. 15, 2012.

(51) Int. Cl.
| | |
|---|---|
| *B01J 20/20* | (2006.01) |
| *B01D 53/64* | (2006.01) |
| *B01J 20/28* | (2006.01) |
| *B01J 20/30* | (2006.01) |
| *B01J 20/34* | (2006.01) |
| *B01D 53/86* | (2006.01) |
| *B01J 20/02* | (2006.01) |

(52) U.S. Cl.
CPC ......... *B01D 53/64* (2013.01); *B01D 53/8665* (2013.01); *B01J 20/0229* (2013.01); *B01J 20/20* (2013.01); *B01J 20/28009* (2013.01); *B01J 20/3021* (2013.01); *B01J 20/3416* (2013.01); *B01J 20/3433* (2013.01); *B01D 2253/102* (2013.01); *B01D 2255/20738* (2013.01); *B01D 2257/602* (2013.01); *B01D 2259/814* (2013.01)

(58) Field of Classification Search
CPC ...................................................... B01J 20/20
See application file for complete search history.

(56) References Cited

U.S. PATENT DOCUMENTS

| | | | | |
|---|---|---|---|---|
| 3,803,033 | A * | 4/1974 | Sutherland | B01D 21/00 |
| | | | | 210/695 |
| 4,366,179 | A * | 12/1982 | Nawata | A23L 3/3436 |
| | | | | 252/189 |
| 4,422,943 | A | 12/1983 | Fender et al. | |
| 4,554,088 | A | 11/1985 | Whitehead et al. | |
| 5,648,591 | A | 7/1997 | Donecker et al. | |
| 5,672,323 | A | 9/1997 | Bhat et al. | |
| 6,187,271 | B1 | 2/2001 | Lee et al. | |
| 7,256,156 | B2 | 8/2007 | Axtell et al. | |
| 7,429,330 | B2 | 9/2008 | Vo et al. | |
| 7,722,843 | B1 | 5/2010 | Srinivasachar | |
| 7,879,136 | B2 | 2/2011 | Mazyck | |
| 8,658,563 | B2 | 2/2014 | Schremmer et al. | |
| 2002/0066368 | A1 | 6/2002 | Zornes | |
| 2005/0155934 | A1 | 7/2005 | Vo et al. | |
| 2008/0060519 | A1 | 3/2008 | Maly et al. | |
| 2010/0239479 | A1 | 9/2010 | Gadkaree et al. | |
| 2014/0374655 | A1 | 12/2014 | Mimna | |

FOREIGN PATENT DOCUMENTS

WO    WO-2004064078 A2 *   7/2004   ............. B01D 53/02

OTHER PUBLICATIONS

Examiner's Report of Canadian Application No. 2,876,164, dated Sep. 26, 2019, 4 pp.
Non-Final Rejection of U.S. Appl. No. 14/349,636 dated Oct. 19, 2017, 6 pp.
Australian Examination Report of AU 2013274862 dated May 17, 2017, 6 pp.
International Search Report and Written Opinion of PCT/US2019/034932 dated Aug. 7, 2019, 8 pp.
U.S. Appl. No. 14/349,636; Office Action dated Apr. 24, 2019; 5 pgs.

\* cited by examiner

*Primary Examiner* — Stuart L Hendrickson
(74) *Attorney, Agent, or Firm* — Berg Hill Greenleaf Ruscitti LLP

(57) ABSTRACT

A magnetic adsorbent, including an admixture of an adsorbent and a magnetic material. A system for removing mercury from a fluid stream, the system including, a magnetic adsorbent injection unit for injecting an admixture of powdered activated carbon and magnetic material into the fluid stream; and a particulate removal unit. Also included are methods for removing mercury from a fluid stream and methods for producing a magnetic sorbent.

7 Claims, 20 Drawing Sheets

MAGNETIC ADSORBENTS, METHODS FOR MANUFACTURING A MAGNETIC ADSORBENT, AND METHODS OF REMOVAL OF CONTAMINANTS FROM FLUID STREAMS

CROSS-REFERENCE TO RELATED APPLICATIONS

This application is a continuation-in-part of U.S. patent application Ser. No. 14/349,636 filed Apr. 3, 2014, which claims the benefit of International Patent Application No. PCT/US2013/026863 filed Feb. 20, 2013, which claims the benefit of U.S. Provisional Patent Application No. 61/660,475, filed Jun. 15, 2012. The entirety of these aforementioned applications is incorporated herein by reference.

TECHNICAL FIELD OF THE INVENTION

This invention relates, in general, to magnetic adsorbents, and, in particular, to magnetic adsorbents, methods for manufacturing a magnetic adsorbent, and methods of removal of contaminants from fluid streams.

BACKGROUND OF THE INVENTION

Without limiting the scope of the present invention, its background will be described in relation to systems and methods for post combustion mercury control using sorbent injection and particulate capture, as an example.

Amongst the numerous hazardous air pollutants (HAPs) currently regulated by the EPA, mercury and mercury-containing compounds have been a source of significant concern due to their increasing rate of release and the lack of adequate control technologies. Although the resulting quantity in the environment is usually low, it can transfer to various organisms, and then magnify up the food chain. For example, the concentration of accumulated mercury in some fish can reach levels that are millions of times greater than that in the water. The consumption of such fish by humans, and the resulting buildup of mercury in various tissues may lead to serious neurological and developmental effects such as losses of sensory or cognitive ability, tremors, inability to walk, convulsions, and even death. Methylmercury, the most common form of organic mercury, is almost completely incorporated into the blood stream, and can be transferred through the placenta and into all of the tissues of the fetus, including that of the brain. Because of the health concerns related to eating mercury contaminated fish, bans on fishing in certain regions such as in the Great Lakes have resulted in considerable losses to the economy. With the introduction of the first national standards for mercury pollution from power plants in December of 2011, many facilities have turned to sorbent injection to meet the EPA Mercury and Air Toxics Standards (MATS) requirements. Sorbent injection is a technology that has shown good potential for achieving mercury removal to the MATS standards.

The EPA has estimated that nearly 87% of the anthropogenic mercury emissions are from sources such as waste (as in waste-to-energy facilities) and fossil fuel combustion (as in coal-fired power plants). Recognizing this, control technologies have been employed in an effort to capture and dispose of the mercury found in combustion exhaust gases. Currently, Powdered Activated Carbon (PAC) injection into the flue gas stream is the best demonstrated control technology for mercury removal. The increased implementation will exact a significant economic burden on regulated facilities. Currently, brominated activated carbons have been shown to have the highest mercury removal rate per pound of product. However, these products have a higher cost margin—and therefore would increase the economic impact—and may cause corrosion of plant equipment. Furthermore, PAC's generally low mercury adsorption efficiency and lack of adequate regeneration technologies have sparked an interest in modifying the material to either decrease costs or improve performance.

Another shortcoming in using PAC injection systems is the accumulation of the waste PAC in the fly ash. Fly ash, the fine particulate fraction of the Coal Combustion Byproducts (CCBs) (i.e., noncombustible inorganics and uncombusted carbon), is collected from flue gas and then commonly sold for beneficial reuse in the production of concrete and other materials. Replacing lime, cement, or crushed stone materials that are typically used in construction materials with fly ash can conserve energy and resources, while providing an alternative to landfill disposal of the waste. However, when typical fly ash collection devices are coupled with PAC injection systems, the quality of the collected fly ash deteriorates because of the large fraction of carbon in the ash. Such fly ash cannot be resold for beneficial reuse and must, instead, be landfilled. Current research geared towards separation technologies has yet to find an adequate method to isolate the PAC from the fly ash. Therefore, a method that can easily separate PAC from the fly ash is desirable. Such a method will (a) maintain the quality of the fly ash for subsequent sale and reuse, and (b) permit the reuse of the PAC for additional mercury capture.

U.S. Pat. No. 7,879,136 teaches a method to recover PAC from fly ash by creating a magnetic activated carbon through a wet precipitation method. This method is similar to U.S. Pat. Nos. 2,479,930, 6,914,034, and 8,097, 185B2, which also teach wet methods using iron precursors to make a magnetic activated carbon. Others have created magnetic adsorbents by: combining the sorbent with a magnetic material using a binder (U.S. Pat. No. 7,429,330), mixing a sorbent with a magnetic material (U.S. Pat. No. 4,260,523), or mixing a magnetic material with an organic material, followed by activation (U.S. Pat. Nos. 4,260,523, 4,201,831, and 7,429,330).

While the methods described by the referenced patents serve well for bench-scale applications, they introduce challenges for full-scale production including, but not limited to, high energy costs. Therefore, dry production methods are critical in translating the magnetic activated carbon technology to full-scale. The use of physical methods to create a co-mingled product for mercury capture has been taught by U.S. Pat. No. 8,057,576 ("the '576 Patent"). The product is an admixture of an adsorptive material and an additive that either complexes with the mercury, oxidizes it, or both. The additive is not implanted on the adsorbent surface. This is highlighted by the fact that one embodiment of the patent teaches injecting the adsorbent and additive separately into the flue gas. The invention of the '576 Patent does not include a magnetic additive, and therefore the product cannot be magnetically recovered from fly ash.

SUMMARY OF THE INVENTION

The present invention disclosed herein is directed to magnetic adsorbents, methods for manufacturing a magnetic adsorbent, and methods of removal of contaminants from fluid streams.

By physically implanting magnetic additives on the adsorbent through dry production methods a cost-effective manner in which an adsorbent for mercury capture can be generated at a large scale is disclosed.

Disclosed herein are processes to manufacture a magnetic adsorbent, a method using the magnetic adsorbent for the removal of contaminants from fluid streams, and the recovery of the magnetic adsorbent after use.

More specifically, a magnetic adsorbent with sufficient oxidizing power, affinity, and surface area for the capture of mercury from the flue gas of coal combustion devices is provided. This material may also be applied for the capture of other target contaminants such as arsenic and selenium. The magnetic adsorbent can then be recovered from the coal combustion flyash, and re-injected into the flue gas for additional mercury capture.

A method of manufacturing the magnetic adsorbent involves combining the selected adsorbent with a magnetic additive and in some cases an oxidizing additive. The precursor adsorbent may be an activated carbon, reactivated carbon, silica gel, zeolite, alumina clay, or other solid material with sufficient surface area for mercury capture. The magnetic additive is preferably one of the following: magnetite, hematite, goethite, or maghemite. The oxidizing additives may include, but are not limited to halides of alkali metals, alkaline earth metals, and ammonium (i.e., $NH_4Br$, KBr, LiBr, NaBr, NaCl, KCl, LiCl, I, LiI, NaI), and semiconductors ($TiO_2$, ZnO, $SnO_2$, $VO_2$, and CdS).

A method for the manufacture of a magnetic adsorbent (Magnetic Adsorbent Creation Method), its application to remove contaminants from a fluid stream, and its recovery after use is provided. A method to manufacture the magnetic adsorbent, involves combining the selected adsorbent with a magnetic additive and in some cases additional additives to improve the oxidation capacity. The additives may be implanted on the adsorbent using a variety of means, including but not limited to: mixing, milling, or grinding the adsorbent and the additives together until some fraction of the material is physically implanted on the surface of the activated carbon.

Furthermore, a method for removing a contaminant or contaminants from a fluid stream is provided (Contaminant Removal Method). The method includes contacting the fluid stream with the magnetic adsorbent whereby the contaminant is adsorbed on the magnetic adsorbent, and then removing the magnetic adsorbent having the contaminant adsorbed thereon from the fluid stream.

Also provided is a method to recycle the collected composite back into contact with the fluid stream for further contaminant removal (Composite Recycling Method).

In one embodiment, a magnetic adsorbent includes an adsorbent and iron oxide implanted onto a surface of the adsorbent, wherein a total surface area of the magnetic adsorbent is not substantially less than a total surface area of the adsorbent. Optionally, the adsorbent is activated carbon. In one configuration, an additive selected from the group consisting of a halogen, a photocatalyst, and a binder is added. In one alternative, the magnetic adsorbent does not include secondary deposits. Optionally, a ratio of the weight of the iron oxide to a total weight of the magnetic adsorbent is between 1% to 20%. In one configuration, a ratio of the weight of the iron oxide to a total weight of the magnetic adsorbent is between 5% to 15%. Alternatively, a ratio of the weight of the iron oxide to a total weight of the magnetic adsorbent is 10%. Optionally, the iron oxide is highly crystalline after implantation. In one configuration, a crystalline nature of the iron oxide is maintained after implantation.

In another embodiment, a magnetic adsorbent consists essentially of an adsorbent; and an iron oxide implanted onto the surface of the adsorbent, wherein a surface area of the magnetic adsorbent is not substantially less than the surface area of the adsorbent. In one configuration the adsorbent is activated carbon.

In one embodiment, a method of making a magnetic adsorbent includes combining an adsorbent and a magnetic material using mechanical mixing equipment. Optionally, the adsorbent is activated carbon and the magnetic material is iron oxide. In one alternative, the mechanical mixing equipment is selected from the group consisting of a ball mill, a jet mill, a conical mill, and a ribbon blender. In another alternative, the mechanical mixing equipment encourages friction and collision between particles. Optionally, the method includes implanting the magnetic material on the surface of the adsorbent. In another alternative, the combining includes grinding and is performed until the magnetic adsorbent will pass through a 325-mesh sieve.

In one embodiment, a method of treating an effluent stream includes treating the effluent stream by injecting magnetic adsorbent particles and using magnetic field to recover the magnetic adsorbent particles. Optionally, the magnetic adsorbent particles are re-injected into the effluent stream with additional magnetic adsorbent particles after recovery. Optionally, the magnetic adsorbent particles remove mercury from the effluent stream.

In another embodiment, high quality fly ash is recovered from a stream treated by a magnetic adsorbent. The method includes capturing the magnetic adsorbent from fly ash in the effluent stream using a magnetic field to generate two products: (1) high quality fly ash, and (2) recovered magnetic adsorbent.

In one embodiment, a system for removing mercury from an effluent system includes an activated carbon injection system, injecting an activated carbon product into an effluent. The system further includes a first electrostatic precipitator positioned after the activated carbon injection system, receiving the effluent. Optionally, the first electrostatic precipitator is positioned immediately following the activated carbon injection system, without any intervening treatments. In one alternative, the activated carbon product is magnetic. In another alternative, the activated carbon product includes a photocatalyst. Optionally, the first electrostatic precipitator activates the photocatalyst. Alternatively, a second electrostatic precipitator immediately precedes the activated carbon injection system. Optionally, the activated carbon product has iron oxide implanted on the surface and has a surface area that is not substantially less than the surface area without the iron oxide.

In another embodiment, an adsorbent includes an activated carbon portion and a magnetic portion joined with the activated carbon portion, wherein magnetic activity of the magnetic portion is not shielded by the activated carbon portion. Optionally, the magnetic portion is implanted on the surface of the activated carbon portion. Alternatively, a total surface area of the activated carbon portion without the magnetic portion is substantially at least the same as a total surface area of the adsorbent.

In one embodiment, the present invention is directed to a magnetic adsorbent, including an admixture of an adsorbent and a magnetic material. In one aspect, the magnetic adsorbent may further include an additional additive selected from at least one of the group consisting of sulfides, organo-sulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents. In another aspect, the additional additive may be one of a dry form and a liquid form.

Also, the magnetic material may be one or more of the group consisting of magnetic sorbent, magnetic particles, and magnetic catalyst. Further, the one or more of the group consisting of magnetic sorbent, magnetic particles, and magnetic catalyst may be coated with at least one additional additive.

In yet another aspect, the adsorbent may be one or more of the group consisting of powdered activated carbon and activated carbon. Also, the magnetic material ratio to total weight of the magnetic adsorbent may be from about 1% to about 20%.

In another embodiment, the present invention may be directed to a system for removing mercury from a fluid stream, the system including a magnetic adsorbent injection unit for injecting an admixture of powdered activated carbon and magnetic material into the fluid stream; and a particulate removal unit. In one aspect, the magnetic adsorbent injection unit may include a source of powdered activated carbon; a source of magnetic material; a pneumatic mixing device for blending the powdered activated carbon and magnetic material to produce the admixture of powdered activated carbon and magnetic material; and a metering unit for metering the mass of powdered activated carbon and magnetic material.

In another aspect, the system may further include an additive unit in communication with the metering unit and pneumatic mixing device for injecting an additive into the fluid stream, the additive being selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents into the fluid stream. Also, the magnetic adsorbent injection unit may include a source of powdered activated carbon; a source of magnetic material; a mechanical mixing device for mixing the powdered activated carbon and magnetic material to produce the admixture of powdered activated carbon and magnetic material; and a metering unit for metering the mass of powdered activated carbon and magnetic material.

Additionally, the system may further include an additive unit in communication with the metering unit and mechanical mixing device for injecting an additive into the fluid stream, the additive being selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents into the fluid stream. Also, the particulate removal unit may further include a magnetic material recovery device for recovering the magnetic material from the fluid stream or particulate stream. In another aspect, the system may further include a magnetic material return line in communication with the magnetic material recovery device and the source of magnetic material for transferring the recovered magnetic material from the magnetic material recovery device to the source of magnetic material.

In yet another embodiment, the present invention may be directed to a system for removing mercury from a fluid stream, the system may include an injection unit for injecting an admixture into the fluid stream; a blending unit in communication with the injection unit; a source of powdered activated carbon in communication with the blending unit; a source of magnetic material in communication with the blending unit; a metering unit for metering the mass of one or more of the powdered activated carbon and magnetic material; and a particulate removal unit for removing particulates in the fluid stream.

In one aspect, the system may further include an additive injection unit in communication with the metering unit and blending unit, the additive injection unit for injecting into the fluid stream an additive selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents.

In another aspect, the blending unit may include a device selected from at least one or more of the group consisting of a blending device, a pneumatically mixing device, a mechanically mixing device, a milling device, a grinding device, a ball milling device, a jet milling device, a classifier milling device, a ribbon blender, a paddle mixer, and a pneumatic mixer for blending one or more of the powdered activated carbon and magnetic material for injecting into the fluid stream. Also, the blending unit may include a device selected from at least one of the group consisting of a blending device, a pneumatically mixing device, a mechanically mixing device, a milling device, a grinding device, a ball milling device, a jet milling device, a classifier milling equipment, and a ribbon blender for blending one or more of the powdered activated carbon, magnetic material, and additive for injecting into the fluid stream.

Further, the particulate removal unit may include a magnetic material recovery device for recovering the magnetic material from the fluid stream or particulate stream. Also, the system may further include a magnetic material return line in communication with the magnetic material recovery device and the source of magnetic material for transferring the recovered magnetic material from the magnetic material recovery device to the source of magnetic material.

In still yet another embodiment, the present invention may be directed to a system for removing mercury from a fluid stream, the system may include a particulate removal unit; a sorbent injection unit disposed upstream of the particulate removal unit for injecting a source of powdered activated carbon into the fluid stream; a magnetic material injection unit disposed upstream of the particulate removal unit for injecting a source of magnetic material into the fluid stream; a controller in communication with the sorbent injection unit and the magnetic material injection unit; a first mercury sensor disposed upstream of the sorbent injection unit and the magnetic material injection unit; and a second mercury sensor disposed downstream of the particulate removal unit, wherein the controller adjusts the ratio of powdered activated carbon and magnetic material injected to the fluid stream based on the efficiency of mercury removal in the fluid stream between the first and second mercury sensors.

In one aspect, the system may further include an additive injection unit disposed upstream of the particulate removal unit, the additive injection unit for injecting into the fluid stream an additive selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents.

In another aspect, the particulate removal unit may further include a magnetic material recovery device for recovering the magnetic material from the fluid stream or particulate stream. Also, the system may further include a magnetic material return line in communication with the magnetic material recovery device and the source of magnetic material for transferring the recovered magnetic material from the magnetic material recovery device to one or more of the magnetic material injection unit and source of magnetic material. Additionally, the system may further include an additive unit for injecting an additive into the fluid stream, the additive being selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents.

In another embodiment, the present invention is directed to a method for removing mercury from a fluid stream, the method including providing a powdered activated carbon and a magnetic material; producing an admixture of the powdered activated carbon and the magnetic material; injecting the admixture into the fluid stream; and removing mercury from the fluid stream; and recovering one or more of the magnetic material and the powdered activated carbon from the fluid stream.

In one aspect, the magnetic material may be iron oxide. In another aspect, the method may further include providing an additional additive into the fluid stream that is selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents. In still another aspect, the producing an admixture may include one or more of the group consisting of blending, pneumatically mixing, mechanically mixing, milling, and grinding. Also, the recovering one or more of the magnetic material further may include providing the recovered magnetic material to produce the admixture of powdered activated carbon and magnetic material.

In another embodiment, the present invention is directed to a method for removing mercury from a fluid stream, the method including injecting a powdered activated carbon into the fluid stream; injecting a magnetic material into the fluid stream; adsorbing the mercury from the fluid stream on at least one of the powdered activated carbon and magnetic material; and recovering one or more of the magnetic material and the powdered activated carbon from the fluid stream; and removing mercury from the fluid stream.

In one aspect, the recovering the magnetic material may include re-injecting the recovered magnetic material into the fluid stream. Also, the magnetic material may be iron oxide. Additionally, the method may further include injecting an additional additive into the fluid stream, the additional additive is selected from one or more of the group consisting of sulfides, organosulfides, inorganic sulfides, acids, nitric acid, sulfuric acid, hydrochloric acid, bases, hydroxide salts, metal oxides, oxides, metals, photocatalysts, minerals, clays, bentonite, aluminosilicates, silicates, and halogens into the fluid stream.

In still yet another embodiment, the present invention is directed to a method for producing a magnetic adsorbent including providing a source of an adsorbent; providing a source of magnetic material; and blending the adsorbent and magnetic material to form a magnetic adsorbent admixture. In one aspect, the method may further include providing an additional additive, the additional additive is selected from one or more of the group consisting of sulfides, organosulfides, inorganic sulfides, oxidizing compounds, acids, nitric acid, sulfuric acid, hydrochloric acid, bases, hydroxide salts, metal oxides, oxides, metals, metal catalyst, transition metal oxides, magnetic oxides, photocatalysts, minerals, clays, bentonite, aluminosilicates, silicates, halogens, and complexing agents. Further, blending the adsorbent and magnetic material may include one or more of the group consisting of blending, pneumatically mixing, mechanically mixing, milling, grinding, ball milling, jet milling, classifier milling equipment, and ribbon blender.

In another embodiment, the present invention is directed to a method for removing mercury from fluid stream, the method including injecting a magnetic adsorbent into a fluid stream; and recovering the magnetic material from the fluid stream. In one aspect, the method may further include re-injecting the magnetic material into the fluid stream with additional magnetic adsorbent.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

Figure 1:
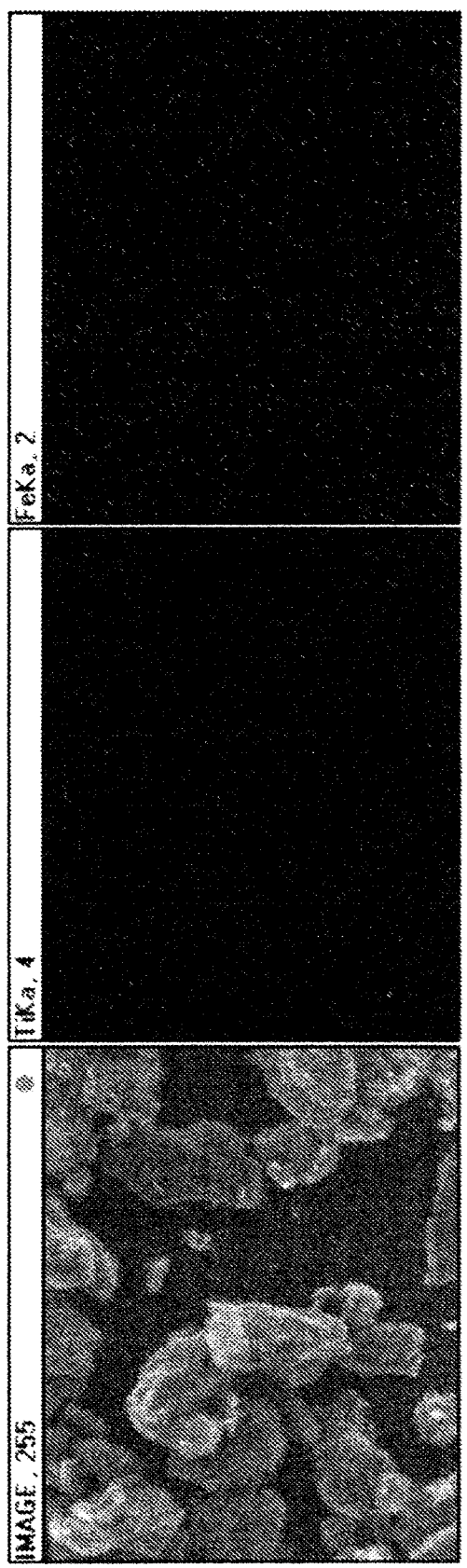
FIG. 1 shows an SEM image and EDS map of the titania and iron signals of the activated carbon adsorbent, demonstrating the absence of additives on the adsorbent surface.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not limit the scope of the present invention.

In one embodiment of a Magnetic Adsorbent Creation Method, magnetic adsorbent composites are prepared, whereby a magnetic material is physically implanted onto the exposed surface of an adsorbent. The implantation may be achieved by simultaneously combining the adsorbent and iron oxide together and using mechanical mixing equipment such as a ball mill, jet mill, conical mill, etc. This mixing environment encourages friction and collision between the particles to promote implantation. Forces for implantation may include Van der Waals Forces, capillary forces, electrical forces and electrostatic coulomb forces. These forces may be promoted during the mixing process.

Surface implantation is an important feature of the magnetic adsorbent created, in contrast to some prior art adsorbents where the magnetic material is implanted within the adsorbent; implantation on the surface does not shield or block the magnetic forces from acting on the magnetic material. This feature provides for the recapture and recycling of magnetic adsorbent since magnetic forces may be applied to recapture it after treatment. This greatly improves the cost effectiveness of the methods and materials described herein. In various places herein the implantation of magnetic materials is discussed. Significant variation of the amount and type of magnetic material implanted is contemplated and may be related to the implantation techniques used and described herein. The adsorbent material for the creation of a magnetic adsorbent will have an appreciable surface area and developed porosity. It can be: activated carbon, reactivated carbon, zeolite, alumina clays, silica gels, etc. For many applications the adsorbent is activated carbon. The term "activated carbon" as used herein is meant to reference powdered or granular carbon used for purification by adsorption. In many configurations the activated carbon used has a surface area between 200 and 1,000 $m^2/g$, more preferably between 300 and 700 $m^2/g$, and most preferably between 400 and 600 $m^2/g$. In some alternatives, powder activated carbon (PAC) is used. For this application, the term "Powdered Activated Carbon" or PAC refers to an activated carbon, 90% of which passes through a 325-mesh sieve (45 μm). Also, the following abbreviations may be used herein: Activated Carbon: AC; Powdered Activated Carbon: PAC; and Magnetic Powdered Activated Carbon: MPAC.

The magnetic material may be at least one of the following: magnetite ($Fe_3O_4$), maghemite ($\gamma$-$Fe_2O_3$), hematite ($\alpha$-$Fe_2O_3$) and goethite (FeO(OH)); and in many embodiments magnetite. The amount of magnetic material in the composite is preferably between at least 1% and less than 20% by weight based on the total weight of the final composite; more preferably between 5% and 15% by weight based on the total weight of the final composite; most preferably 10% by weight based on the total weight of the final composite.

Figure 2:
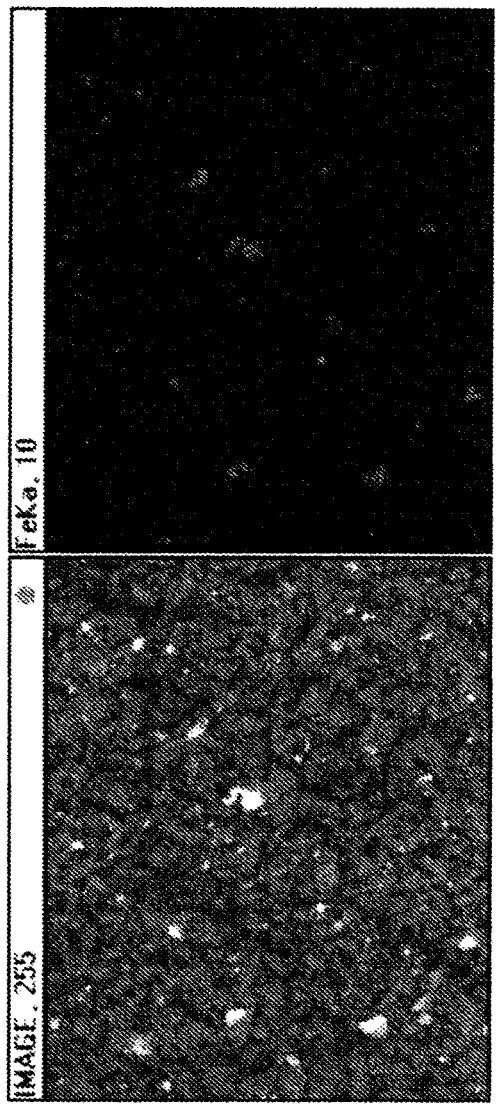
FIG. 2 shows an SEM image and an EDS map of the iron signal of a magnetic adsorbent prepared by milling an activated carbon material with magnetite at a loading of 10% by weight, demonstrating the distribution of magnetite throughout the sample, on its surface.
Figure 3:
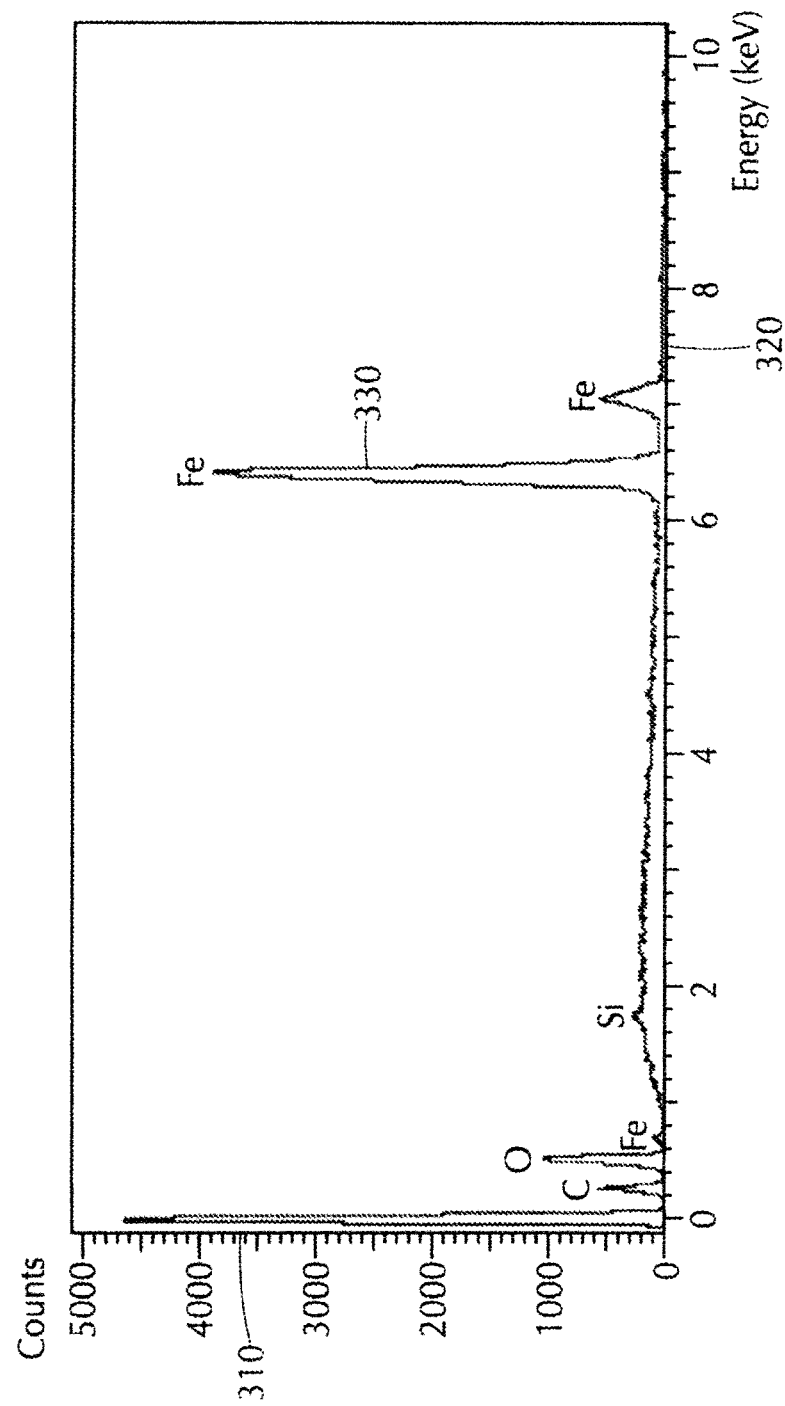
FIG. 3 represents a spot EDS analysis on a particle isolated in FIG. 2, demonstrating the clear presence of iron on the adsorbent.

FIGS. 1-3 show the results of a composite made as described above. FIG. 1 shows a Scanning Electron Microscope (SEM) image and an Energy-dispersive X-ray spectroscopy (EDS) map of the titanium dioxide (titania) and iron signals of the activated carbon adsorbent at 500 times magnification, demonstrating the absence of additives on the adsorbent surface according to one embodiment. FIG. 2 shows a sample created according to the milling with activated carbon described above. FIG. 2 shows an SEM image and an EDS map of the iron signal of a magnetic adsorbent at 500 times magnification prepared by milling an activated carbon material with magnetite at a loading of 10% by weight, demonstrating the distribution of magnetite throughout the sample, on its surface. In FIG. 3 a graph showing the occurrence of primarily Fe 330 on the activated carbon is shown as compared to other elements. FIG. 3 represents a spot EDS analysis on a particle isolated on Fe-particle in ball milled sample ($FeO_x$), demonstrating the clear presence of iron on the adsorbent. The graph shows the counts 310 vs. energy (keV) 320.

Additionally, other additives, such as oxidizers, photocatalysts, and binders, may be applied. Oxidizing additives may be selected from halides of alkali metals, alkaline earth metals, and ammonium (i.e., $NH_4Br$, KBr, LiBr, NaBr, NaCl, KCl, LiCl, KI, LiI, NaI) and photocatalysts (i.e., $TiO_2$, ZnO, $VO_2$, $SnO_2$, and CdS). Some oxidizing additives and photocatalyts may also act as a binder, encouraging the magnetic additives to adhere to the adsorbent surface. Other separate binders may also be applied (i.e., Binders). In many embodiments described herein, the adsorbent is activated carbon, the magnetic material is magnetite, and the oxidizing and/or binding additives are NaBr and/or $TiO_2$. The amount of additional additive material in the composite is preferably between at least 0.1% and less than 10% by weight based on the total weight of the final composite; more preferably between 0.5% and 5% by weight based on the total weight of the final composite.

Additional features of embodiments of magnetic adsorbent created include unique iron oxide concentration, the crystalline nature of the iron oxide included, the absence of secondary deposits or byproducts on the surface, the impact on the physical characteristics of the magnetic adsorbent, and the additives that may be added. In some embodiments, the iron oxide concentration of the magnetic adsorbent produced is between 1% and 20% by weight, more preferably between 5% and 15% by weight, most preferably 10% by weight. By using magnetic additives such as (maghemite ($\gamma$-$Fe_2O_3$), hematite ($\alpha$-$Fe_2O_3$) and magnetite ($Fe_3O_4$)) that are already crystalline in nature, the Magnetic Adsorbent Creation Method produces an adsorbent that maintains the crystalline structure of the magnetic material. This crystallinity is likely greater than that of materials produced via wet chemistry methods. Further, since heat treatments are not necessary in the Magnetic Adsorbent Creation Method, the crystalline nature is not degraded.

The occurrence of secondary deposits is also reduced or eliminated by the Magnetic Adsorbent Creation Method. In contrast, wet chemistry methodologies may include reactants that leave byproducts and interact with the adsorbent or iron oxide. The Magnetic Adsorbent Creation Method further does not erode the pore volume or pore size of the magnetic adsorbent and may result in a slight measurable increase in total surface area caused by interstitial spaces created by the adhered particles on the surface of the activated carbon adding to the available surface area. In many wet chemistry methodologies the deposition of iron oxides may degrade the surface area, pore size, and pore volume. The magnetic adsorbent can be treated with a halogen, a photocatalyst, or a binder to further enhance the mercury oxidation and therefore adsorption and removal from the contaminated stream. By adding a known magnetic species, the magnetic strength is controlled and deposited on the surface of the adsorbent. Surface-deposition of the magnetic material allows magnetic forces for recovery to be maximized. Further, the speciation and crystallinity of the magnetic material is not altered by production, thereby protecting its magnetic properties. This is in contrast to those methods that deposit the magnetic material within the sorbent, where the sorbent material itself can mask the magnetic forces and hinder recovery. Additionally, those methods that teach magnetic doping of a sorbent precursor followed by activation will likely face difficulties controlling the speciation and crystallinity, and therefore the magnetic properties, of the magnetic compounds.

Once production is complete, the material can be applied for contaminant removal in a fluid stream. While the said material has the potential to be effective for various contaminants in a myriad of fluid streams, it is known to be effective for the contaminant mercury and the fluid stream of flue gas. In this representation, the material is removed from the flue gas by typical particle collection devices in operation, such as electrostatic precipitators, fabric filters, cyclones, and even scrubbers. It will be appreciated by those skilled in the art that although embodiments are described in connection with the removal of mercury from flue gas, embodiments are not limited to the removal of mercury from flue gas and may be used to remove other heavy metals and contaminants of interest including, but not limited to, arsenic, selenium, and boron.

After the composite is separated from the fluid stream and collected, it can be recovered and reused. The recovery utilizes the magnetic properties of the material. Using the above scenario as an example, the magnetic material is collected in an electrostatic precipitator with other flue gas particles (fly ash). A magnetic recovery system is applied after the electrostatic precipitator collection to separate the magnetic material from the fly ash. The magnetic material is then stored for reuse. Additionally, before reuse, the material may be regenerated using chemical or thermal techniques. The material may then be reapplied for further contaminant removal from the fluid stream. Utilizing this technique results in significant cost savings for the user and reduces the quantity of waste materials.

In one embodiment the composite is treated with a halogen known for oxidizing Hg. In this regard, the halogenated composite may be formed by (i) mechanically mixing a halogen compound, a magnetic material and adsorbent; (ii) exposing the composite of adsorbent and magnetic material to a halogen gas; or (iii) reacting the magnetic material and a halogen, then co-milling the resultant with adsorbent.

In another embodiment a photocatalyst, for example, titanium dioxide ($TiO_2$), is included in the magnetic adsorbent. Hydroxyl radicals can be generated on the surface of $TiO_2$ in an excited state; these powerful oxidants enhance mercury capture by oxidizing elemental Hg to form, for example, HgO. The oxidized mercury (e.g., HgO) can then serve as additional sorption sites for elemental Hg, increasing mercury capture as a whole. Furthermore, as the adsorbent is re-injected for mercury capture, the gradual buildup of HgO on the sorbent may improve mercury uptake over the injection cycles. In those scenarios where electrostatic precipitators (ESP) are used for particulate capture, the energy required to excite $TiO_2$'s electrons to generate hydroxyl radical formation is provided by the ESP itself. For bag house installations, UV lamps generating wavelengths less than about 365 nm would be required to provide the required energy for $TiO_2$ excitation. As would be recognized by one skilled in the art, UV radiation includes invisible radiation wavelengths from about 4 nanometers, on the border of the x-ray region, to about 380 nanometers, just beyond the violet in the visible spectrum.

Figure 4:
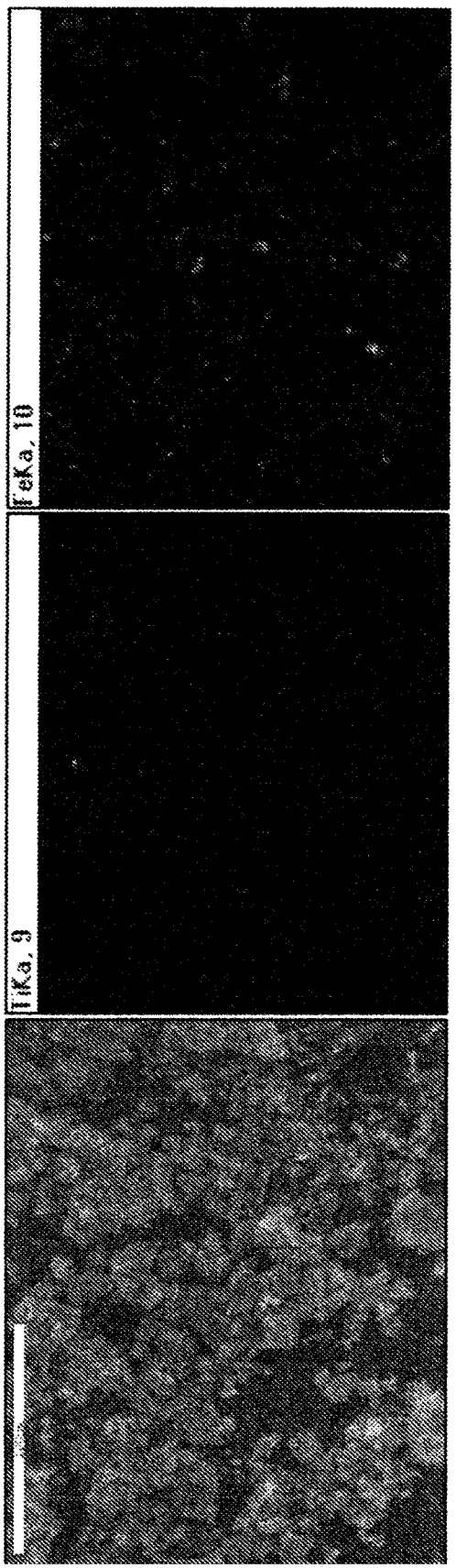
FIG. 4 represents an SEM image and an EDS map of the iron and titania signal of a magnetic adsorbent prepared through ball-milling an activated carbon adsorbent with $TiO_2$ and magnetite at 1% and 10% loading by weight, respectively. The image demonstrates the wide distribution of magnetite, as well as the presence of titania, on the adsorbent surface.
Figure 5:
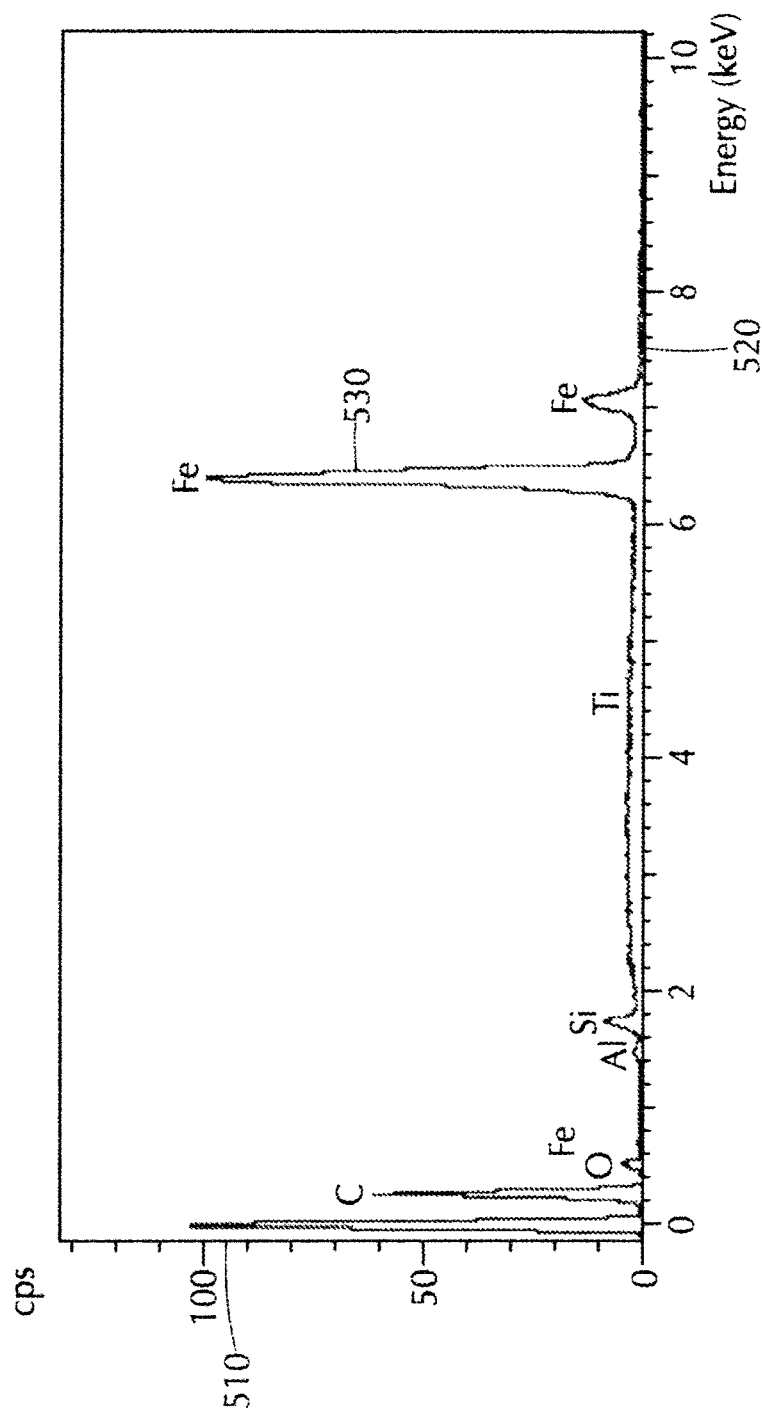
FIG. 5 represents a spot EDS analysis on a particle isolated in FIG. 4, demonstrating the clear presence of iron on the adsorbent.
Figure 6:
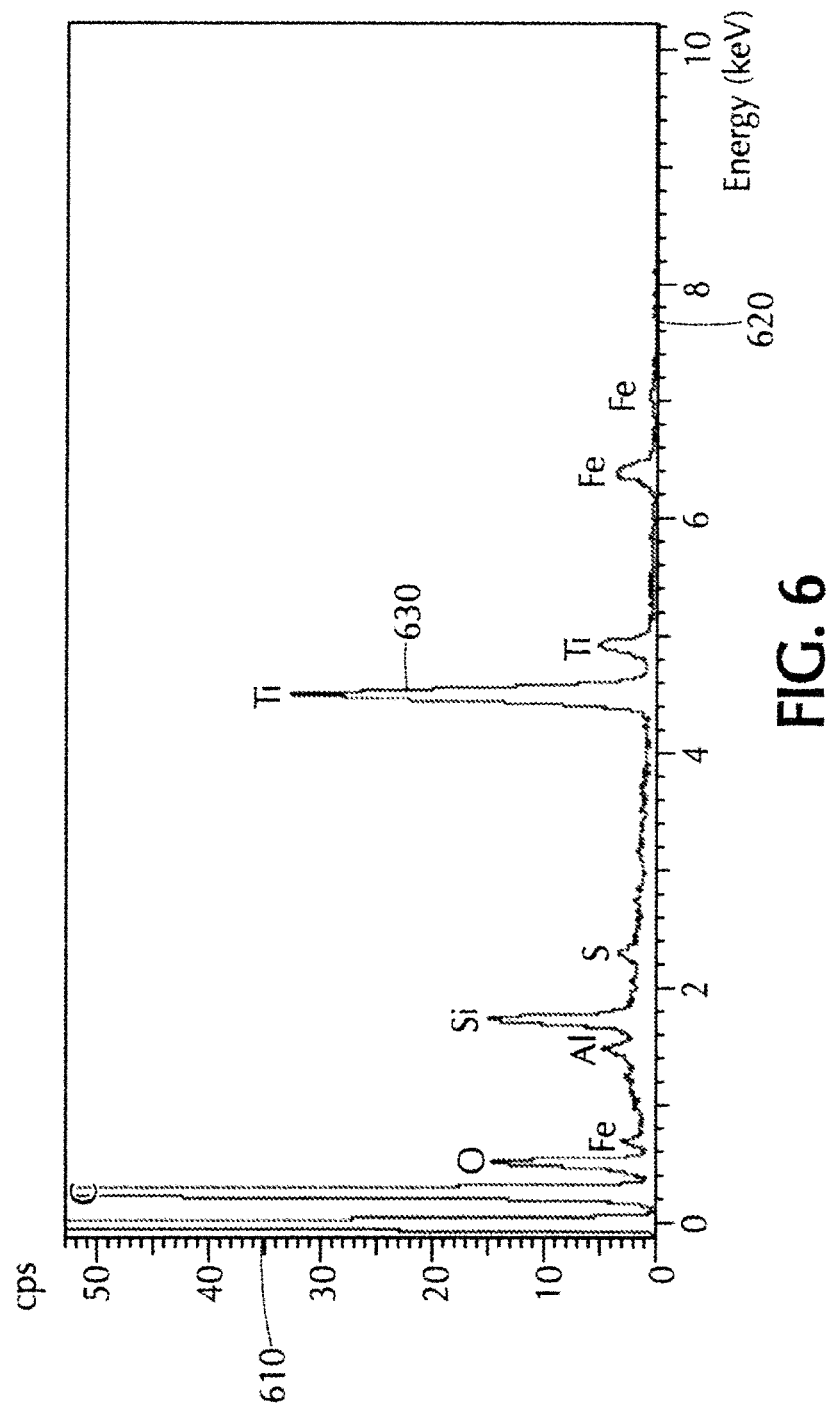
FIG. 6 represents a spot EDS analysis on a particle isolated in FIG. 4, demonstrating the clear presence of titania on the adsorbent.
Figure 7:
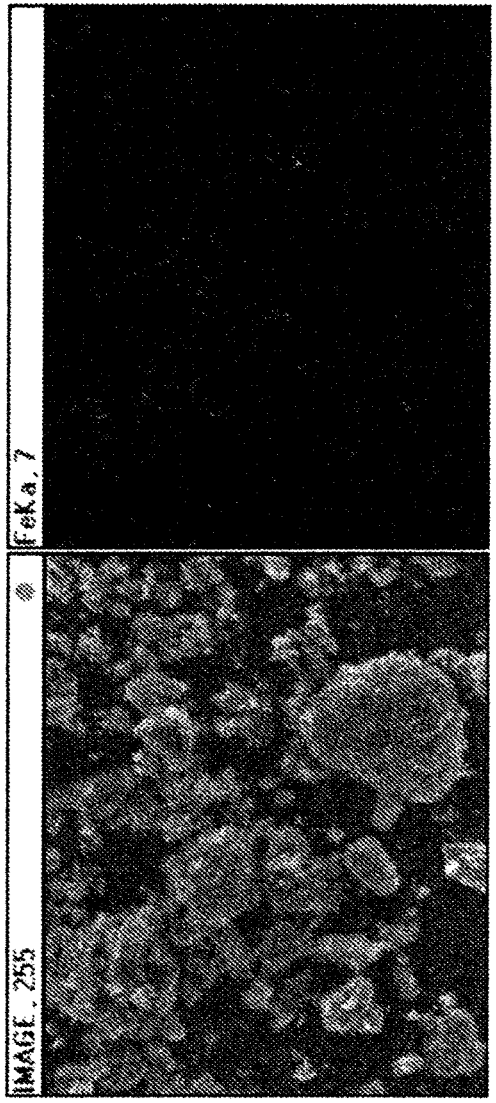
FIG. 7 represents an SEM image and an EDS map of the iron signal of a magnetic adsorbent prepared with magnetite, at a loading of 10% by weight, via mechano fusion. The figure demonstrates the distribution of magnetite throughout the sample, on its surface.

FIGS. 4-6 show the results from preparing a ball milled sample as described above with $TiO_2$/$FeO_x$. FIG. 4 represents an SEM image and an EDS map of the iron and titania signal of a magnetic adsorbent (at 500 times magnification) prepared through ball-milling an activated carbon adsorbent with $TiO_2$ and magnetite at 1% and 10% loading by weight, respectively, demonstrating the wide distribution of magnetite, as well as the presence of titania, on the adsorbent surface. FIG. 5 represents a spot EDS analysis on a particle isolated on Fe-particle in ball milled sample ($TiO_2$/$FeO_x$), demonstrating the clear presence of iron on the adsorbent. FIG. 5 demonstrates the existence of iron with peak 530. The graph shows the counts 510 vs. energy (keV) 520. FIG. 6 represents a spot EDS analysis on a particle isolated on Ti-particle in ball milled sample ($TiO_2$/$FeO_x$), demonstrating the clear presence of titania on the adsorbent. FIG. 6 demonstrates the existence of Ti with peak 630. The graph shows the counts 610 vs. energy (keV) 620. FIG. 7 represents an SEM image and an EDS map of the iron signal of a magnetic adsorbent (at 500 times magnification) prepared with magnetite, at a loading of 10% by weight, via mechano-fusion; demonstrating the distribution of magnetite throughout the sample, on its surface. The magnetic adsorbent will have a specific fraction of magnetized particles depending on the manufacturing technique. In some embodiments, this fraction is recoverable from fly ash or other non-magnetic particles from fluid streams (such as air and water). The magnetic recovery is achieved by passing a mixed particle stream through a magnetic recovery device. One example is using a design similar to an electrostatic precipitator (ESP) with electromagnets to collect the magnetic adsorbent while allowing the other particles to pass through the collection device. The recovered magnetic adsorbent can then be regenerated or reused, depending on the application. In flue gas treatment for mercury, magnetic adsorbent is separated from the other particles (fly ash) in the flue gas airflow. The recovered, used magnetic adsorbent would be mingled with fresh magnetic adsorbent, and then injected again for in-flight mercury capture. This has the added benefit of improving the quality of the flyash for potential salability.

Figure 11A:
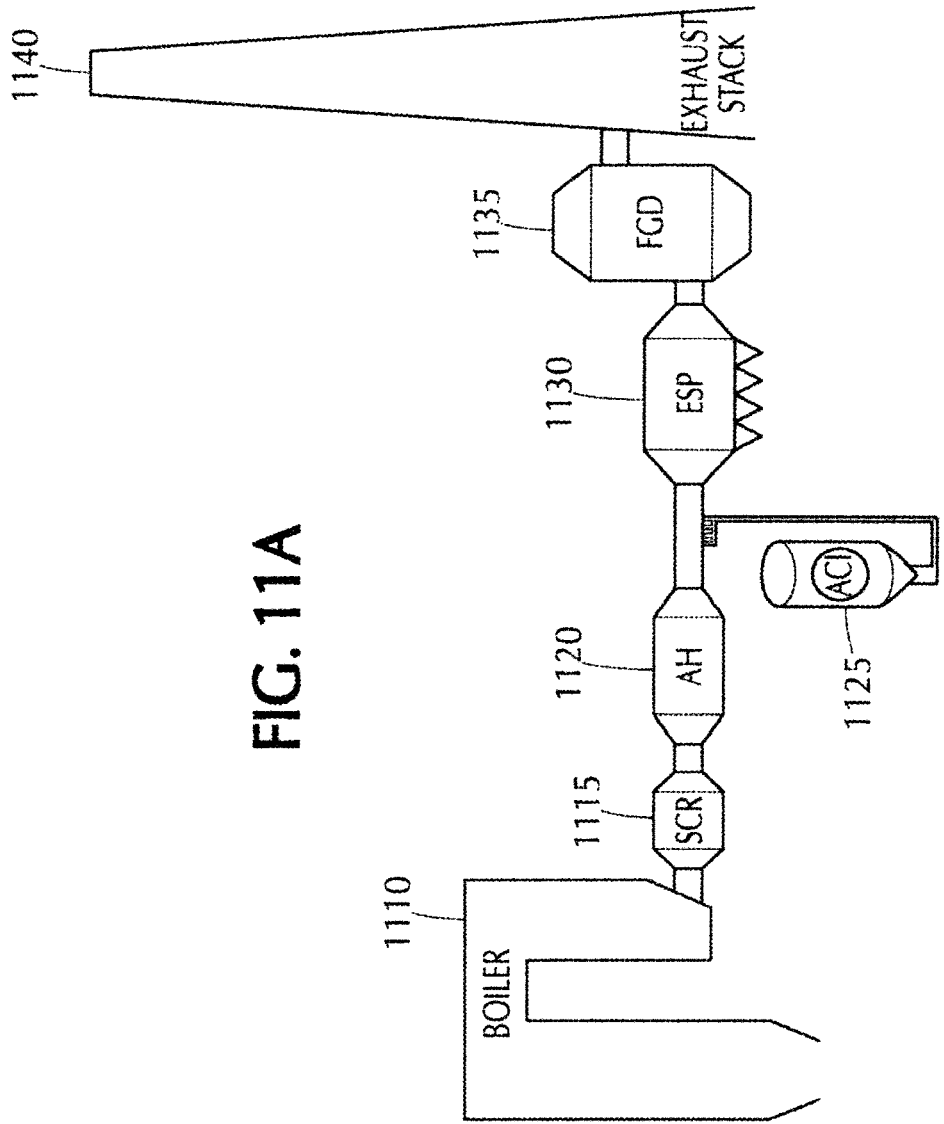
FIGS. 11A and 11B show embodiments of an activate carbon injection system upstream of an electrostatic precipitator (ESP) for injecting an admixture of powdered sorbent and magnetic material.
Figure 11B:
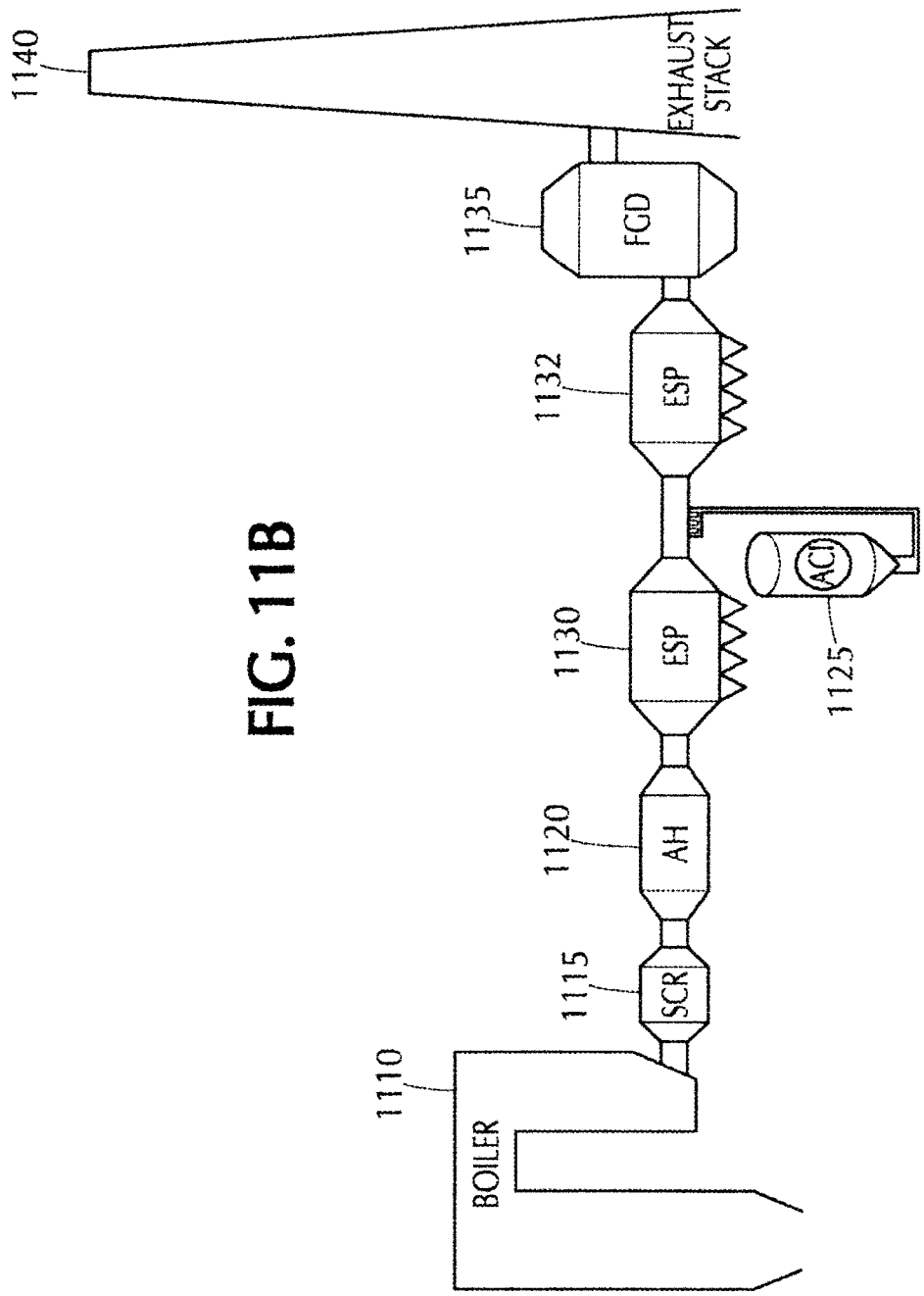

FIGS. 11A and 11B show two embodiments of an activated carbon injection system positioned before and between an ESP, respectively. Boiler 1110 feeds to a selective catalytic reduction system 1115. Then the effluent flows to an air heater 1120. At this point, activated carbon is injected from ACI 1125. The activated carbon then passes through the ESP 1130 which produces an electrostatic discharge, which, in some embodiments, can excite the properties of the activated carbon to result in enhanced mercury removal. Finally, the flue gas passes through the flue gas desulfurization 1135 and out of exhaust stack 1140. In FIG. 11B a first ESP 1130 precedes the injection of activated carbon and a second ESP 1132 follows. The injection may also occur before both ESPs. Other instances would exclude the use of a selective catalytic reduction system 1115 or a flue gas desulfurization 1135. The activated carbon in many of these cases, as described above, includes a photocatalyst. The advantage of this system is that similar results may be achieved as compared to an activated carbon system with a fabric filter, without the same pressure drop as would be experienced with a fabric filter. In some cases an ACI system and an added ESP system may be used to retrofit existing plants. As mentioned above, this system may provide synergy with the magnetic adsorbent for mercury removal but be less costly than other well established retrofits known by those skilled in the art, such as a fabric filter installation for ACI, and may be easily integrated into existing systems. In some configurations, the positioning of the ESP in a typical system may enhance the activity of the activated carbon as compared to systems injecting activated carbon at an earlier point in the system. Typically, ESP systems are located near the end of an effluent cleaning system as shown in FIGS. 11A and 11B. Therefore, activated carbon may be injected immediately before the ESP and may have higher effectiveness since the effluent will have cooled significantly by that point in the system. Also, fewer other constituents may exist in the effluent immediately before the ESP, therefore allowing the activated carbon to work primarily to remove Mercury. The specific configuration of the system will determine the exact operating parameters and removal capabilities. In some embodiments halogens may be substituted for the photocatalyst.

Example 1

Preparation of Activated Carbon/Iron Composite

A magnetic activated carbon sample with a 10% by weight concentration of magnetite ($Fe_3O_4$) was prepared by simultaneously grinding 9 g of activated carbon with 1 g of magnetite in a ball mill. Grinding continued until 90% of the final product would pass through a 325-mesh sieve. A virgin product was also prepared using the same activated carbon, but with no additive, milled to the same specification.

Hg Removal

Figure 8:
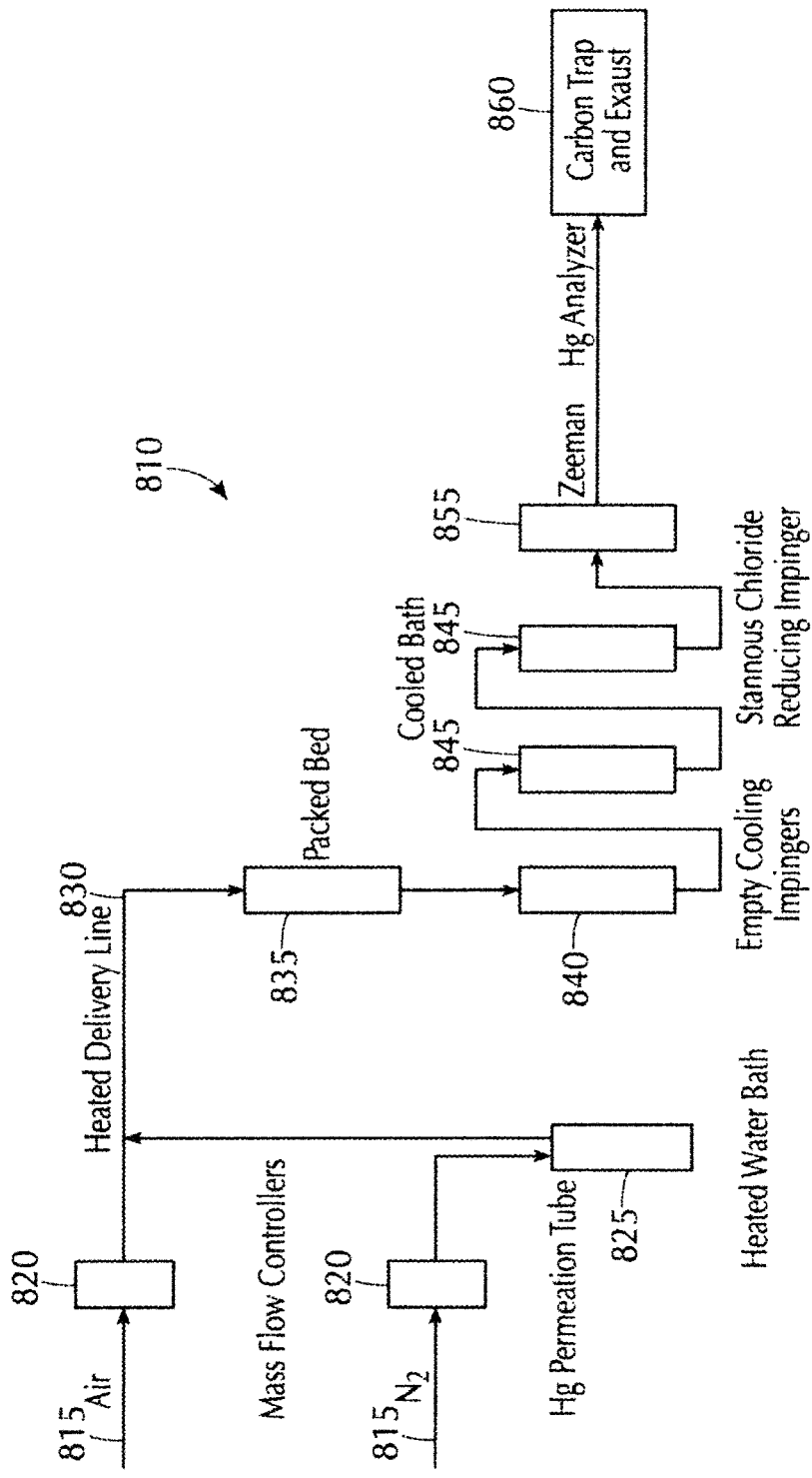
FIG. 8 represents a schematic of the bench scale apparatus used to collect the fixed bed data presented herein.

FIG. 8 presents the bench-scale test stand that was used to quantify the adsorption capacity of the inventive MPAC. Air 815 and High-grade nitrogen gas 815 were passed through mass flow controllers 820, to control the flow of air representing effluent into the system. The nitrogen gas 815 from reservoir was passed through an elemental mercury permeation tube 825 to create a mercury vapor laden air with 10 $\mu g/m^3$ of Hg. The mercury vapor was then transported through a heating tube 830 to the fixed-bed reaction column. The temperature of the Hg gas was monitored and maintained at 150° C. upstream of the MPAC 835. The sorbent was evenly dispersed within a matrix of silica sand, and supported on a quartz frit. The temperature of the sorbent bed was monitored and maintained at 110° C. using heating tape. Effluent gas from the sorbent bed was cooled using a series of impingers 840, 845 in a water bath prior to monitoring elemental Hg by an inline RA-915 Zeeman Mercury Spectrometer (Ohio Lumex) 855. Effluent concentrations of mercury from the stand were recorded for comparison of composite PAC samples. A carbon trap and exhaust system 860 collected remaining waste from the system.

The Hg adsorption capacities of the composite and the virgin counterpart were quantified using the test stand shown in FIG. 8. Table 1 summarizes the test results. As shown, the addition of iron oxide produced a sorbent with greater Hg removal capacity. Table 2 shows the characteristics of the virgin AC and the composite product.

TABLE 1

Hg Removal Results for the Virgin AC and MPAC Products.

| Sorbent | Loading (mg Hg/g sorbent) | | |
|---|---|---|---|
| | T = 30 seconds | T = 1 min | T = 5 min |
| Virgin Activated Carbon | 1.7 | 3.4 | 11.2 |
| MPAC 5% $Fe_3O_4$ | 7.8 | 16.5 | 39.2 |

TABLE 2

Characteristics of Virgin AC and MPAC Products

| Sample | BET $m^2/g$ | Pore size Å | Pore Vol. cc/g | BJH P. Vol. cc/g |
|---|---|---|---|---|
| Base AC | 382 | 10.6 | 0.20 | 0.05 |
| MPAC 5% $Fe_3O_4$ | 370 | 30.6 | 0.28 | 0.13 |

It is clear from the data in Table 1 that the iron oxide coating improved the ability of the sorbent to trap Hg from the air stream. This is likely attributable to the iron oxidizing the elemental Hg to Hg(II), which is more amenable for adsorption by activated carbon.

Example 2

Preparation of Activated Carbon/Iron Composite

A magnetic activated carbon sample with a 10% by weight concentration of magnetite ($Fe_3O_4$) was prepared by simultaneously milling 18 lbs. of activated carbon with 2 lbs. of magnetite in a ball mill. Grinding continued until 95% of the final product would pass through a 325-mesh sieve. Two additional sorbents were made by adding additional oxidants. The first was prepared by simultaneously milling 18 lbs. of activated carbon with 2 lbs. of magnetite and 0.2 lb. of $TiO_2$ in a ball mill to the same size specification as the first. The second was prepared by simultaneously milling 18 lbs, of activated carbon with 2 lbs. of magnetite and 0.5 lb. of NaBr in a ball mill to the same size specification as the first. A fourth and fifth carbon was procured from a commercial activated carbon supplier designed for the mercury removal from flue gas application.

Mercury Removal

Figure 9:
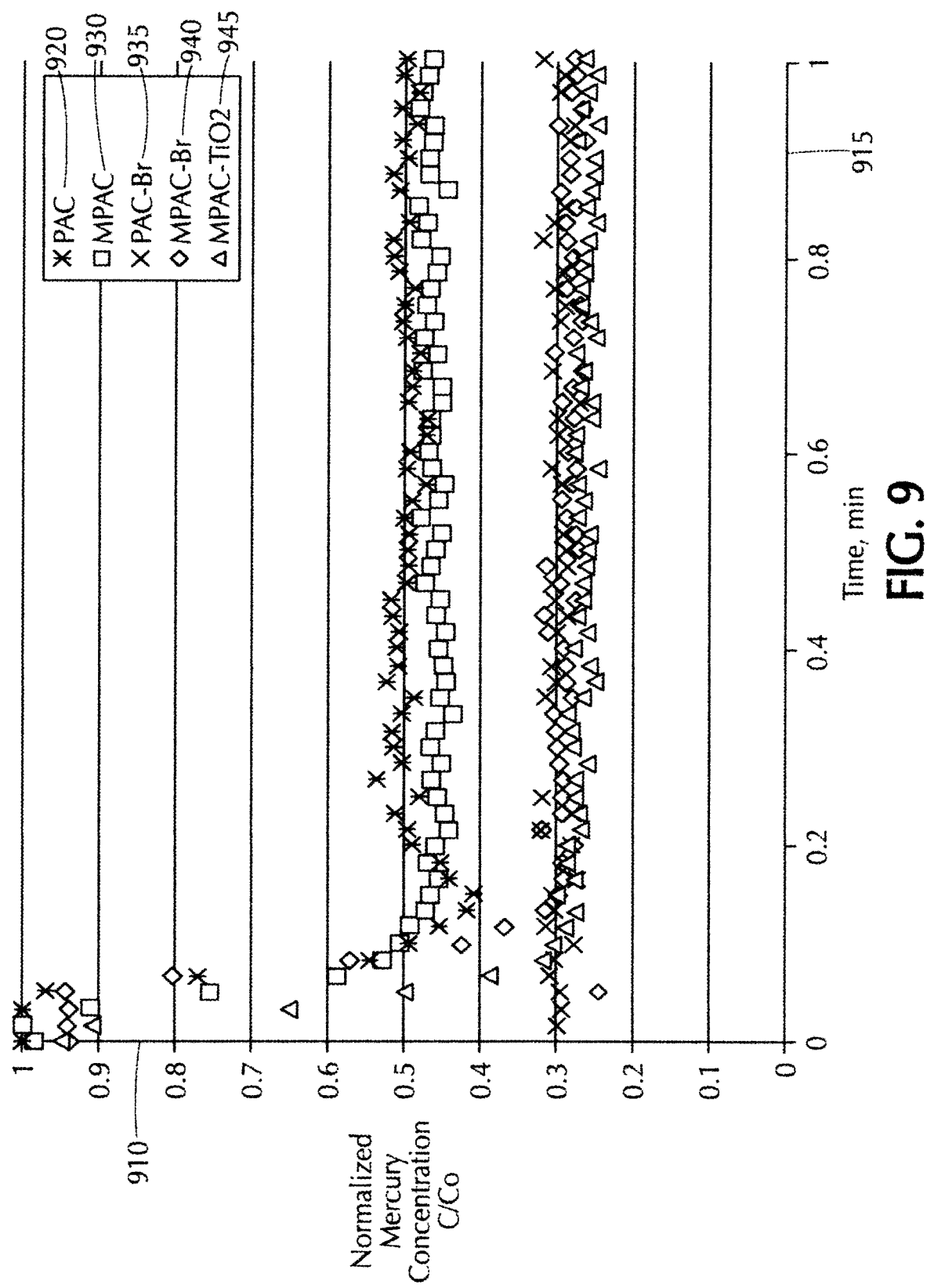
FIG. 9 represents the mercury removal curve during a fixed bed evaluation with various magnetic adsorbent materials, demonstrating the benefit of additives for mercury removal.

Following from the above examples, FIG. 9 represents the mercury removal curve during a fixed bed evaluation with various magnetic adsorbent materials, demonstrating the benefit of additives for mercury removal. The y-axis 910 shows the normalized mercury concentration in C/Co. The x-axis 915 represents time in minutes. The results for various additives are shown including commercial PAC 920, MPAC 930, commercial PAC-Br 935, MPAC-Br 940, and MPAC-TiO₂ 945 in accordance with the various embodiments described herein.

Figure 10:
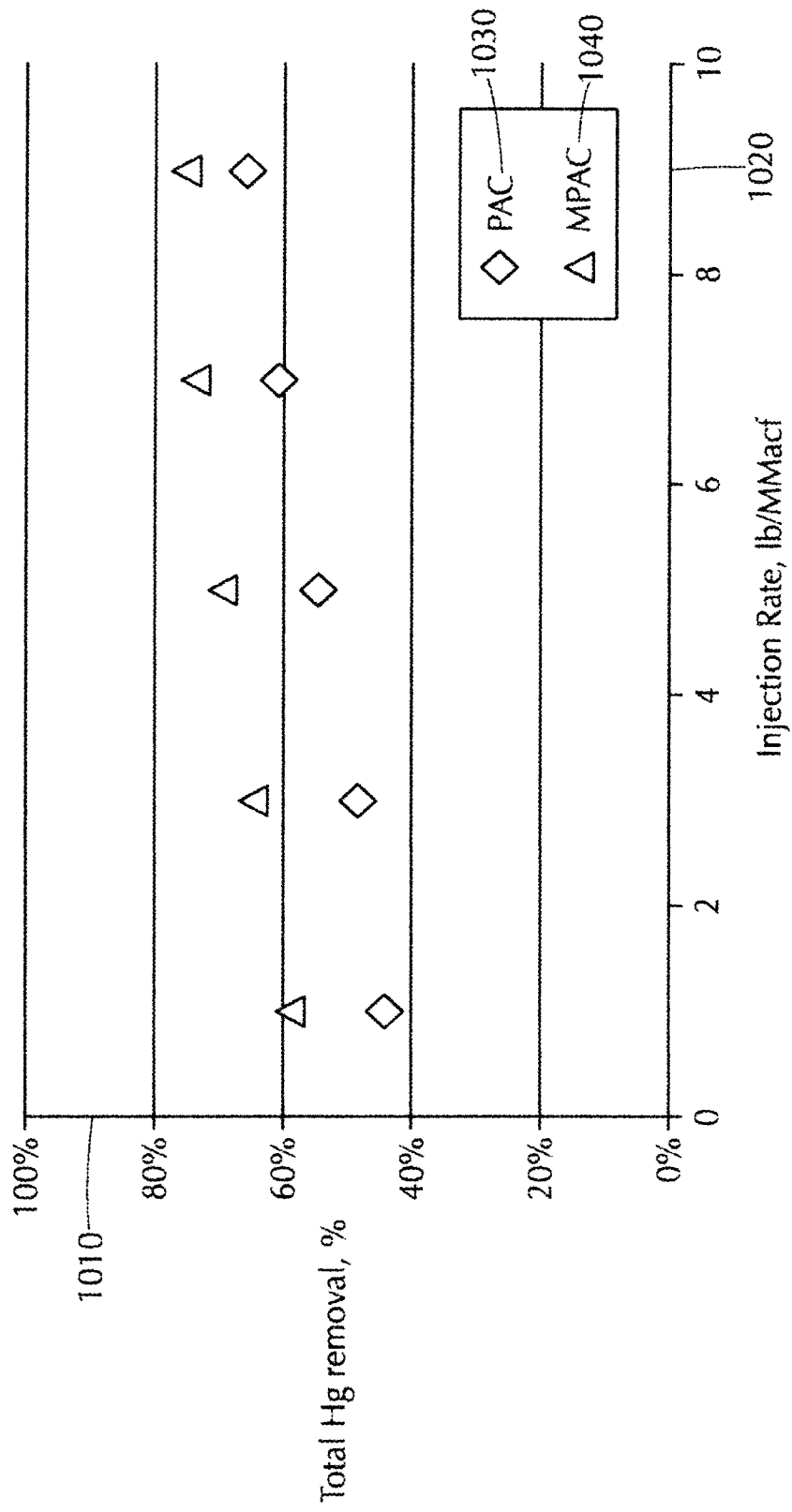
FIG. 10 represents the mercury removal curve during actual flue gas conditions with the base activated carbon and the produced magnetic adsorbent, demonstrating the benefit for mercury removal.

FIG. 10 represents the mercury removal curve during actual flue gas conditions with the base activated carbon (injection in a 5 MW slip stream flue gas) for a Base AC (PAC) 1030 and a MPAC 1040 coated with 5% $Fe_3O_4$ by weight of the produced magnetic adsorbent, demonstrating the benefit for mercury removal. The y-axis 1010 shows the total percentage of mercury removal and the x-axis 1020 shows the injection rate in lb/MM acf.

Figure 12:
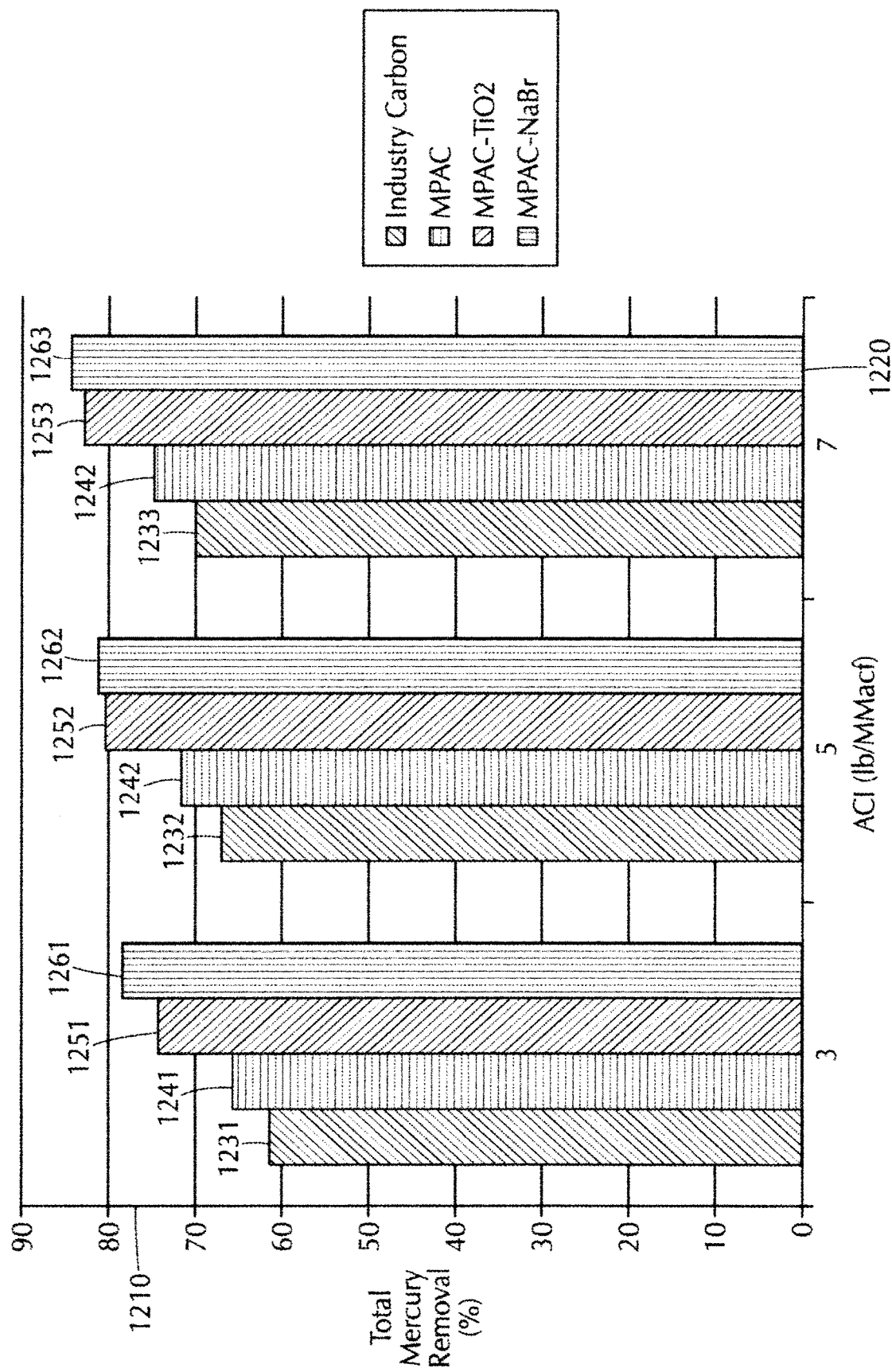
FIG. 12 shows Mercury removal curve for activated carbon injection in a 5 MW slip stream flue gas for a PAC readily available for commercial purchase in the industry (Industry Carbon), a MPAC coated with 10% $Fe_3O_4$ (MPAC), with 10% $Fe_3O_4$ and 1% $TiO_2$ (MPAC-$TiO_2$), and another with 10% $Fe_3O_4$ and 2.5% NaBr (MPAC-Na-Br) by weight.

Four products were tested at the Mercury Research Center (MRC). The MRC removes a constant flow of approximately 20,500 acfm of flue gas (representative of a 5 MW boiler) from the Southern Company Plant Christ Boiler (78 MW). The boiler runs on low-sulfur bituminous coal blend from varying sources. While typical $SO_3$ concentrations of previous fuel blends resulted in less than 1 parts per million (ppm) of $SO_2$, the current coal blend lead to $SO_3$ concentrations between 2-3 ppm downstream of the air heater (AH). The products were pneumatically injected at 3, 5, and 7 lb/MMacf injection rates upstream of the electrostatic precipitator (ESP). Particulate removal was achieved with the ESP. Mercury concentrations were monitored at the MRC inlet and just downstream of the ESP and the observed concentrations were adjusted to 3% oxygen concentration for the purpose of standardization for comparison. Total mercury removal was calculated as the inlet mercury concentration (in μg/m³ at STP and 3% $O_2$) minus the outlet mercury concentration (in μg/m³ at STP and 3% $O_2$) divided by the inlet and is illustrated in FIG. 12. Compared to the commercially available activated carbon, the MPAC carbons 1241, 1242, 1251, 1252, 1253, 1261, 1262, 1263, show significant advantage in higher mercury removal percentages. In the figure showing the activated carbon injection in a 5 MW slip stream flue gas the bars shown are as follows: a PAC 1231, 1232, 1233, readily available for commercial purchase in the industry (Industry Carbon), a MPAC coated with 10% $Fe_3O_4$ (MPAC) 1241, 1242, with 10% $Fe_3O_4$ and 1% $TiO_2$ (MPAC-TiO₂) 1251, 1252, 1253, and another with 10% $Fe_3O_4$ and 2.5% NaBr (MPAC-Na-Br) 1261, 1262, 1263 by weight.

Figure 13:
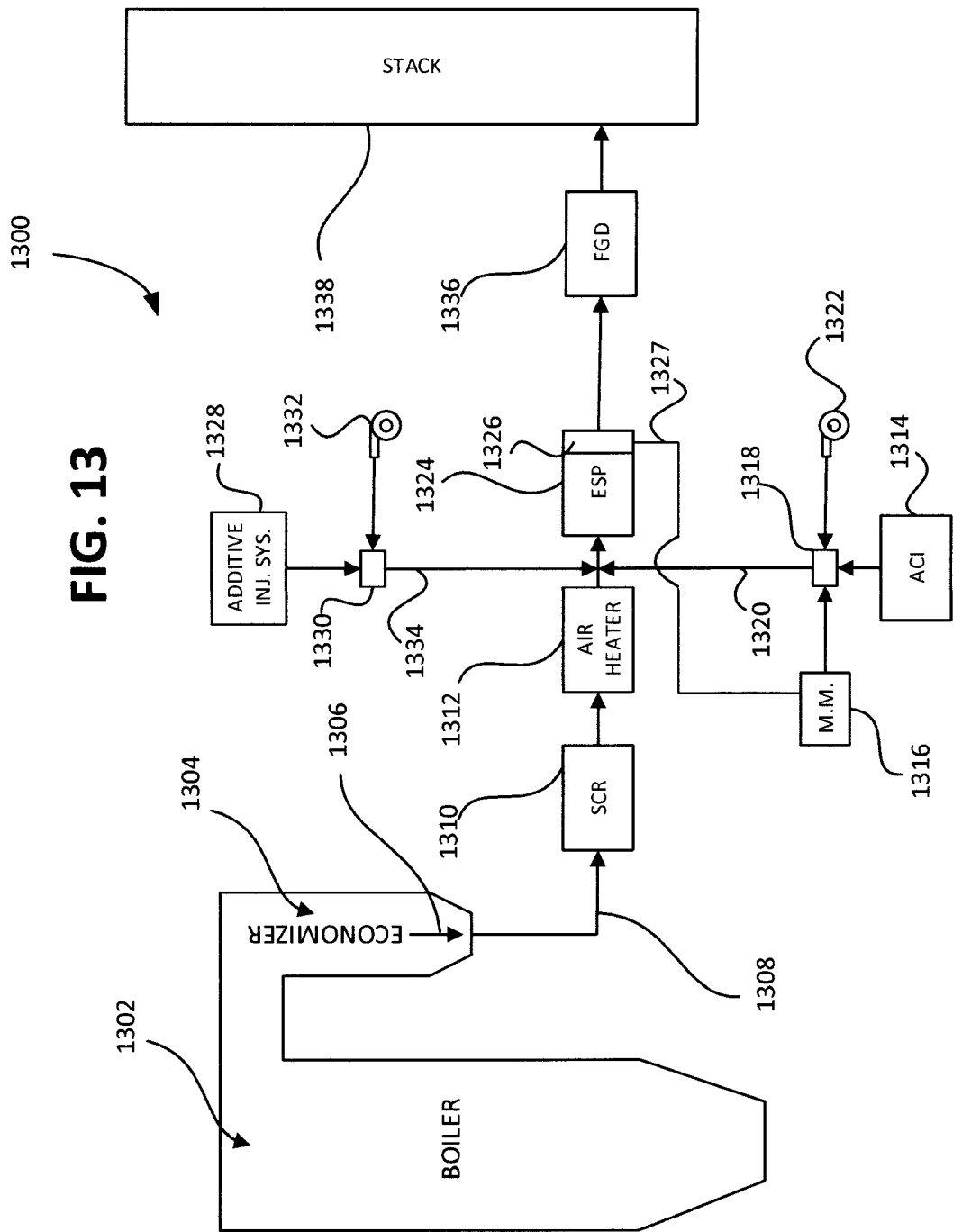
FIG. 13 is a block diagram of a system for removal of contaminants from fluid streams having pneumatic mixing features according to an embodiment.

Turning now to FIG. 13, an embodiment of a system for injecting PAC into a process gas/fluid stream and/or fluid stream for controlling or reducing pollutants in a gas stream is schematically illustrated and generally designated 1300. In one embodiment, system 1300 may include a coal-fired electric power generation plant. System 1300 may include a boiler 1302, such as for a coal-fired power plant. Although the example described herein applies to coal-fired power plants, the process gas/fluid stream or flue gas to be treated may originate from many industrial facilities such as a power plant, cement plant, waste incinerator, or other facilities that will occur to one skilled in the art.

Such gas streams contain many contaminants and/or pollutants, such as mercury, that are desirable to control and/or decrease in concentration for protection of health and the environment. Nevertheless, system 1300 is being described for removing, controlling, and/or reducing pollutants, such as mercury, from a coal-fired power plant gas stream using one or more of activated carbon injection devices/units and additive injection devices/units as discussed herein. Boiler 1302 may be a coal-fired boiler that burns or combusts coal to heat water into superheated steam for driving steam turbines that produce electricity. These types of power plants are common throughout the U.S. and elsewhere. Boiler 1302 may further include an economizer 1304, in one embodiment. Economizer 1304 may be used to recover heat produced from boiler 1302.

The flue gas or process gas/fluid stream 1306 exiting boiler 1302 and/or economizer 1304 may then be flowed, transported, ducted, piped, etc. via one or more process lines 1308 to a selective catalytic reduction unit 1310 for the removal of nitrogen containing compounds, in one embodiment. Typically, selective catalytic reduction unit 1310 may convert $NO_x$ compounds to diatomic nitrogen ($N_2$) and water ($H_2O$) using a catalyst and a gaseous reductant, such as an ammonia containing compound.

Process gas/fluid stream 1306 may then be flowed, transported, ducted, piped, etc. to a heat exchanger, pre-heater, and/or air heater 1312 where heat is transferred from fluid stream 1306 to a feed of air to be fed back into boiler 1302.

System 1300 may further include one or more activated carbon injection ("ACI") devices, units, systems, etc. (ACI unit 1314). ACI unit 1314 may include an activated storage vessel, such as a powdered activated carbon (PAC) storage vessel. Such vessels may be silos, and the like where activated carbon, such as PAC, may be stored for use in system 1300. Activated carbon silo (not shown) may be any type of storage vessel such that it is capable of containing a supply and/or feedstock of activated carbon, such as PAC, for supplying the activated carbon to process gas/fluid stream 1306 of system 1300. Some additional exemplary activated carbon silos may include supersacs, silos, storage vessels, and the like.

PAC may be injected anywhere along process line 1308, but preferably it is injected upstream of an electrostatic precipitator as described further below. In one embodiment, system 1300 may include one or more fluidizing nozzles (not shown) that may assist in providing PAC in a fluidized form, such that it may be transported in a substantially fluid form downstream in system 1300. Additionally, system 1300 may include one or more control valves (not shown) that may be disposed and/or located substantially proximal to the exit or outlet of PAC and/or fluidizing nozzles for controlling the flow of PAC from ACI unit 1314 to system 1300. The feed of PAC can also be controlled by a series of additional control valves, movable barriers, etc. (not shown). To assist the process of fluidizing activated carbon for exiting ACI unit 1314, fluidization assistance may be applied in the form of physical agitation or the use of fluidizing nozzles. In addition, system 1300 may include other types of control valves, such as manual valves (not shown), and the like as would be known to those skilled in the art.

In one embodiment, system 1300 may include a magnetic material injection unit/device 1316 that injects magnetic material into the stream of PAC from ACI unit 1314. A meter 1318 may be used to meter the amount of magnetic material as described herein into the stream of PAC being supplied in process line 1320 prior to injection into process gas/fluid stream 1306. In addition, system 1300 may include a pneumatic device/unit 1322 for providing a source of gas, fluid, etc., such as air, for blending the ACI from ACI unit 1314 and the magnetic material from magnetic material injection unit 1316. Pneumatic device 1322 may be located in any desirable location, including in communication with process line 1320 and/or meter 1318.

Figure 14:
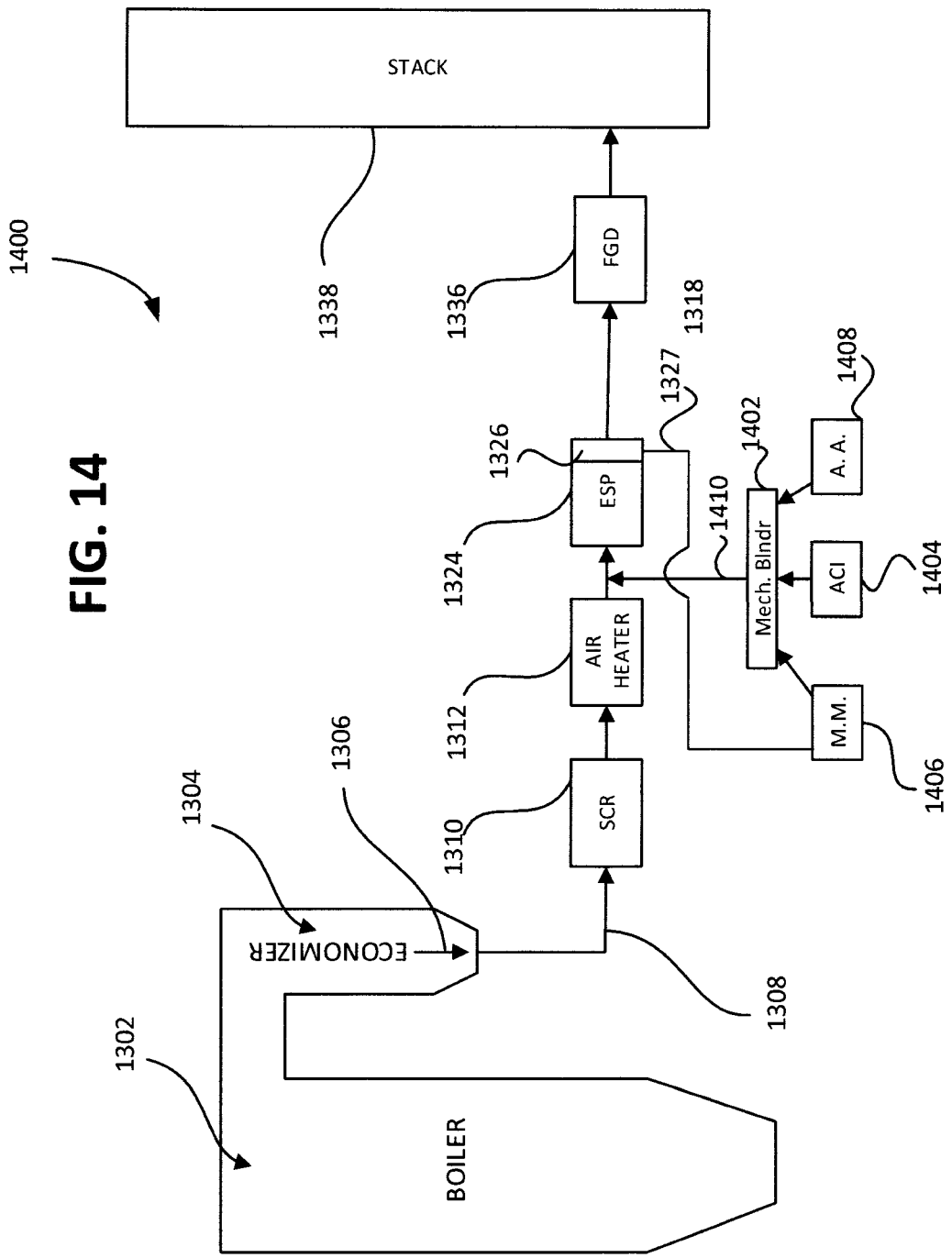
FIG. 14 is a block diagram of a system for removal of contaminants from fluid streams having mechanical mixing features according to an embodiment.
Figure 15:
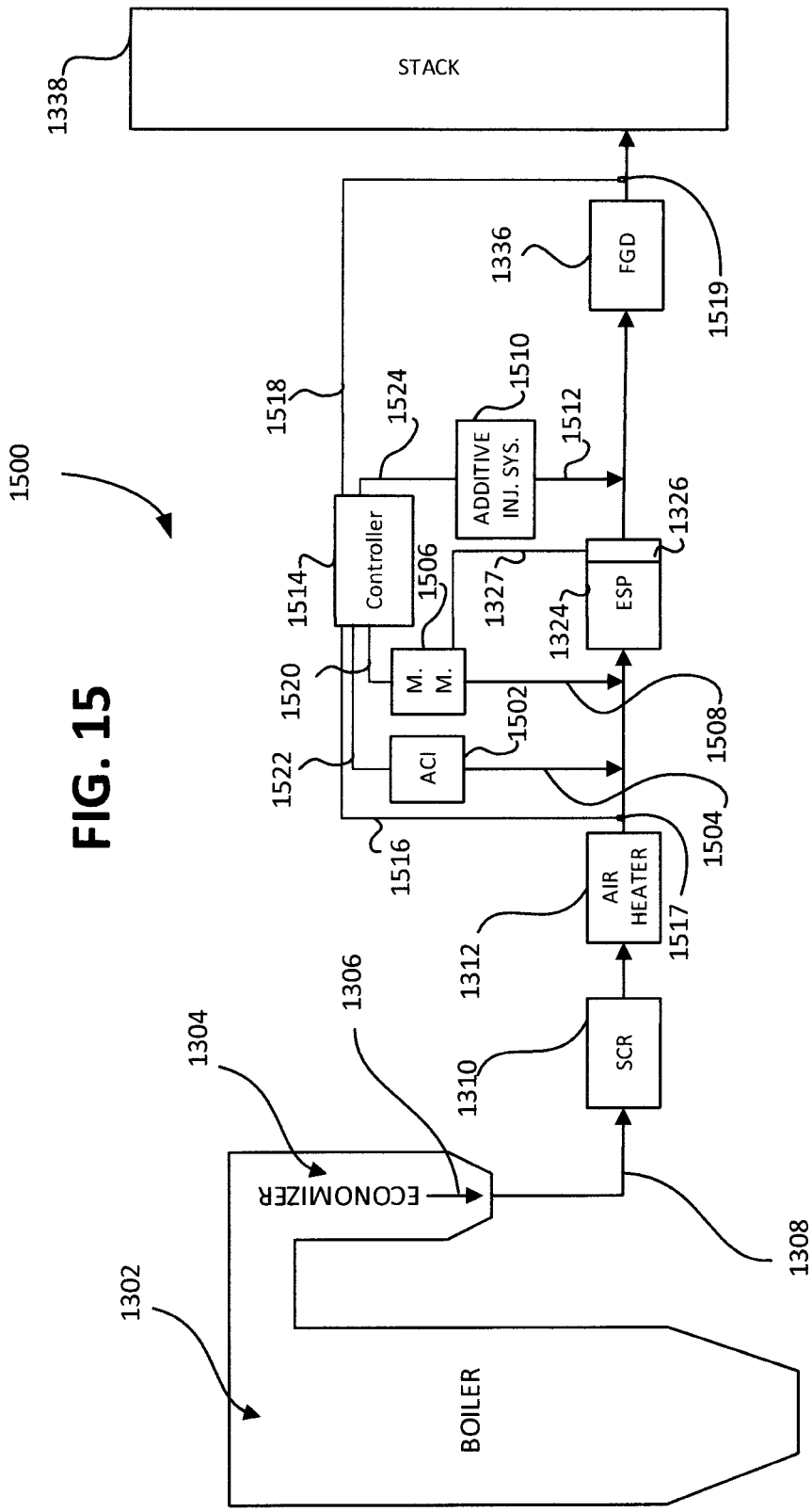
FIG. 15 is a block diagram of a system for removal of contaminants from fluid streams having PAC/magnetic materials mixing control features according to an embodiment.

Process gas/fluid stream 1306 may then be transferred via process line 1308 to an electrostatic precipitator 1324 for removal of particulates contained in process gas/fluid stream 1306, in one example. Additionally, electrostatic precipitator 1324 may include a magnetic material recovery device/unit 1326 for removing the magnetic material from process gas/fluid stream 1306 or particulate stream. In another embodiment, electrostatic precipitator 1324 may not include magnetic material recovery unit 1326. The recovered magnetic material may be transported back to magnetic material injection unit 1316 (magnetic material 1406 and magnetic material unit 1506; FIGS. 14 and 15) via process line 1327, in one embodiment. In another embodiment, process line 1327 may feed a different storage/injection point of magnetic material.

System 1300 may also include an additive injection device/unit 1328 for injecting one or more compounds, chemicals, etc., such as organosulfides, inorganic sulfides, acids, bases, metal oxides, oxides, metals, photocatalysts, and/or minerals to aid with sorbent performance. Preferably, additive injection unit 1328 is located upstream of electrostatic precipitator 1324 for injecting these compounds and/or chemicals prior to injection of activated carbon products as discussed herein.

In one embodiment, system 1300 may include a meter 1330 that may be used to meter the amount of additional additive as described herein into the stream of process gas/fluid stream 1306 being supplied in process line 1334 prior to injection into process gas/fluid stream 1306. In addition, system 1300 may include a pneumatic device/unit 1332 for providing a source of gas, fluid, etc., such as air, for providing pneumatic force for transporting the additional additive to process gas/fluid stream 1306. Pneumatic device 1332 may be located in any desirable location, including in communication with process line 1334 and/or meter 1330. In another embodiment, additive injection device/unit 1328 may be in communication with meter 1318 for providing a metered mass of additional additive to process gas/fluid stream 1306 via process line 1320.

The treated process gas/fluid stream 1306 may then be sent to a flue gas desulfurization unit 1336 via process line 1308 for removal of sulfur compounds, in one embodiment. After being treated in flue gas desulfurization unit 1336, treated process gas/fluid stream 1306 may then be sent to a stack 1338 for emission into the environment.

Turning now to FIG. 14, another embodiment of a system for injecting PAC into a process gas/fluid stream for controlling or reducing pollutants in a gas stream is schematically illustrated and generally designated 1400. System 1400 may include many of the same or similar units and devices as system 1300 as seen by their same reference numbers, thus further description of them will not be repeated here, but should be incorporated from system 1300 above according to their reference numbers.

System 1400 may include a mechanical blending unit 1402 for blending one or more of the PAC, magnetic materials, additional additives, etc. In one embodiment, the mechanical blending unit 1402 may include any type of blending systems, methods, machines, etc., including a ball mill, a jet mill, a conical mill, ribbon blender, blender, milling device, paddle mixer, etc. In another embodiment, the blending system may be may occur at a production facility and then the admixture sorbent may be brought or transported to the system for injection into process gas/fluid stream 1306. Preferably, the mechanical blending unit 1402 encourages friction and collision between particles. Mechanical blending unit 1402 may be in contact with one or more of a supply of ACI 1404 (PAC), a supply of magnetic material 1406, and a supply of additional additives 1408. In one embodiment, one or more of the additives described herein and provided by supply of additional additives 1408 may be in dry or wet form. In one example, supply of additional additives 1408 may be in a wet form such that the blending or mixing of the PAC, magnetic material, and additional additives provides a form of facilitating the components to stick together to create a magnetic sorbent.

The blended or mixed components in mechanical blending unit 1402 may then be flowed, transported, ducted, piped, etc. via one or more process lines 1410 to process gas/fluid stream 1306 prior or upstream of electrostatic precipitator 1324, in one embodiment. Process gas/fluid stream 1306 may then be processed further as described with reference to system 1300.

Referring now to FIG. 15, another embodiment of a system for injecting PAC into a process gas/fluid stream for controlling or reducing pollutants in a gas stream is schematically illustrated and generally designated 1500. System 1500 may include many of the same or similar units and devices as system 1300 as seen by their same reference numbers, thus further description of them will not be repeated here, but should be incorporated from system 1300 above according to their reference numbers.

System 1500 may include an ACI unit 1502 for storing and providing a supply of PAC to process gas/fluid stream 1306 preferably downstream of air heater 1312 via process lines 1504, in one embodiment. In addition, system 1500 may include a magnetic material unit 1506 for storing and providing a supply of magnetic material to process gas/fluid stream 1306 via process lines 1508. Although ACI unit 1502 is depicted being upstream of ACI unit 1502, in another embodiment, magnetic material unit 1506 may be upstream of magnetic material unit 1506. In this embodiment, ACI unit 1502 and magnetic material unit 1506 may provide or inject their respective materials into process gas/fluid stream 1306 separately from each other.

System 1500 may further include an additional additives unit 1510 for storing and providing a supply of additional additives to process gas/fluid stream 1306 via process lines 1512. In one embodiment, additional additives unit 1510 may be located downstream of electrostatic precipitator 1324, but in another embodiment, additional additives unit 1510 may be located upstream of electrostatic precipitator 1324. System 1500 may further include a control unit 1514 for monitoring the ratio of PAC to magnetic material and additional additive and also for monitoring the levels of mercury removal from process gas/fluid stream 1306 as described further below.

Control unit 1514 may have a communication line 1516 that is in communication with process lines 1308 and/or process gas/fluid stream 1306 for monitoring the concentration/levels of mercury upstream of process lines 1504 and/or process lines 1508. Additionally, control unit 1514 may have a communication line 1518 that is in communication with process lines 1308 and/or process gas/fluid stream 1306 for monitoring the concentration/levels of mercury downstream of flue gas desulfurization unit 1336, in one embodiment. In another embodiment, communication line 1516 and communication line 1518 may be located elsewhere along process lines 1308 and/or process gas/fluid stream 1306 for determining an initial mercury concentration/level and a concentration/level of mercury post treatment. Such determination may be used to determine the efficiency of system 1500. Communication line 1516 and communication line 1518 may further include sensors, monitors, etc. (sensor 1517 and sensor 1519, respectively) for monitoring the concentration of mercury at their respective points.

In addition, system 1500 may include a control line 1520 for controlling the amount of magnetic material being provided or injected into process gas/fluid stream 1306 and/or process lines 1308 from magnetic material unit 1506. Also, system 1500 may include a control line 1522 for controlling the amount of PAC provided or injected into process gas/fluid stream 1306 and/or process lines 1308 from ACI unit 1502. The ratio of magnetic material to PAC may be determined by control unit 1514, in one embodiment. Additionally, system 1500 may include a control line 1524 for controlling the amount of additional additives provided or injected into process gas/fluid stream 1306 and/or process lines 1308 from additional additives unit 1510.

Additional additives may include oxidizing additives, such as acids, nitric acid, sulfuric acid, hydrochloric acid, bases, hydroxide salts, and metal oxides, for example. Additional additives may also include mercury binding agents, such as sulfide compounds, organosulfides, inorganic sulfides, etc. The additional additives may be added in a dry form or a wet/solution form. Additional additives may also include binding materials, such as clays, bentonite, aluminosilicates, silicates, etc. Additional additives may further include metal catalysts, such as metal oxides, transition metal oxides, magnetic catalysts, iron oxides, etc. Further, the magnetic adsorbent may be treated with a halogen, a photocatalyst, a binder, or an oxidant in the form of a salt, solid, or liquid form to further enhance mercury oxidation.

The magnetic material may be composed of magnetic sorbent, magnetic particles, magnetic particles coated with additives, magnetic sorbent impregnated or composed of an admixture with other additional additives. In one embodiment of a magnetic particle coated with additional additives, the proximity of the magnetic catalyst to the oxidant additive allows for improved kinetics of mercury oxidation in the flue gas stream.

Figure 16:
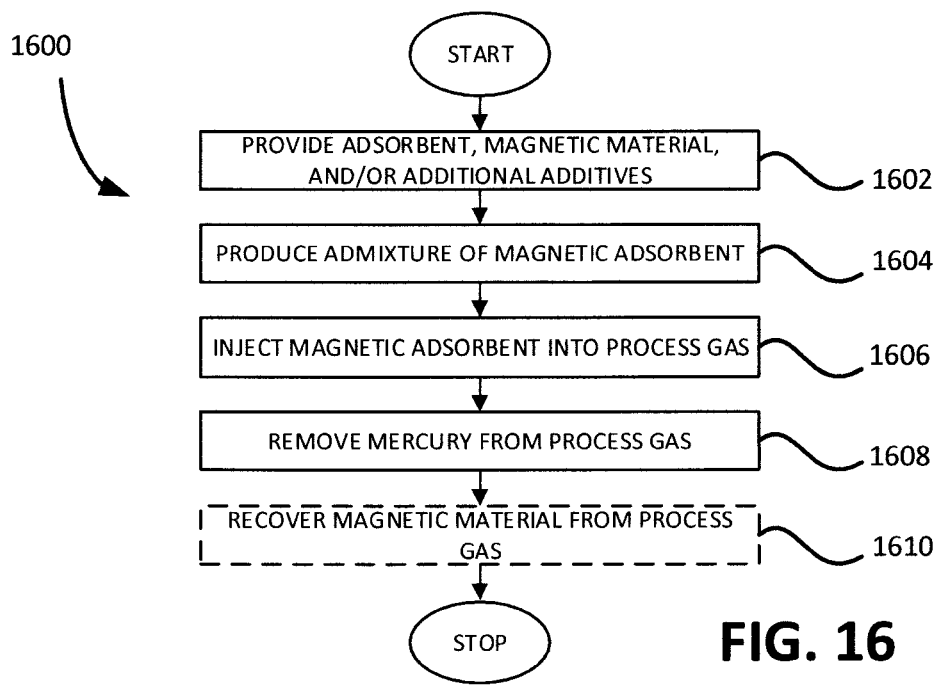
FIG. 16 is a flowchart of a process for removal of contaminants from fluid streams according to an embodiment.

Turning now to FIG. 16, a method for removing mercury or decreasing the mercury concentration in a process stream is schematically illustrated and generally designated 1600. In step 1602, a PAC and a magnetic material may be provided to a mixing, blending, grinding, etc. device/unit. Alternatively, this step may also include preparing the magnetic sorbent off site at a production facility and transporting the magnetic adsorbent to the system, or on-site point of use preparation. In step 1604, the PAC and magnetic material may be blended or mixed to produce an admixture. This step provides for low production costs, recover, and re-use of the magnetic catalyst, retains the crystalline structure of the catalyst, retains the sorbent's available surface area, low PAC concentrations remain in the fly ash to retain concrete compatibility, and reduces fly ash.

This step may also include an additional additive to making an admixture of the PAC, magnetic material, and additional additive. This step may include using a liquid additional additive to produce a uniform product. This step may also include the liquid additional additive may act as a binding agent to create a magnetic sorbent. In another embodiment, the additional additive may be either wet or dry. In step 1606, the admixture is injected into a process stream, such as process gas/fluid stream 1306, for example.

In step 1608, mercury is removed from process gas/fluid stream 1306 by the admixture that was injected in step 1606. In optional step 1610, the magnetic material may be recovered from the process gas/fluid stream 1306 for further use in the method. This step may include using a magnetic material recovery unit, such as magnetic material recovery unit 1326.

Figure 17:
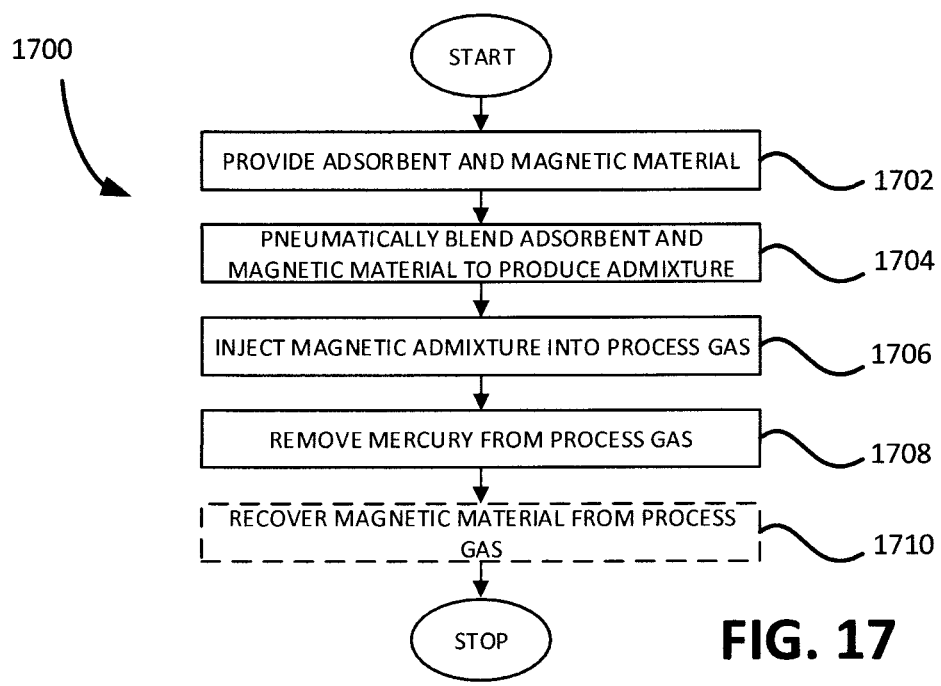
FIG. 17 is a flowchart of a process for removal of contaminants from fluid streams according to another embodiment.

With reference to FIG. 17, a method for removing mercury or decreasing the mercury concentration in a process stream is schematically illustrated and generally designated 1700. In step 1702, an adsorbent and a magnetic material may be provided to for further processing. Optionally, this step may include providing additional additives as well. In step 1704, the PAC and magnetic material may be blended or mixed using a pneumatic line or device. This step may further include metering one or more of the PAC and magnetic material into the pneumatic line, such as process line 1320, which is in contact with a source of gas or fluid, under pressure in one aspect, such as pneumatic device 1322. In step 1706, the admixture is injected into a process stream, such as process gas/fluid stream 1306, for example.

In step 1708, mercury is removed from process gas/fluid stream 1306 by the admixture that was injected in step 1706. In optional step 1710, the magnetic material may be recovered from the process gas/fluid stream 1306 for further use in the method. This step may include using a magnetic material recovery unit, such as magnetic material recovery unit 1326.

Figure 18:
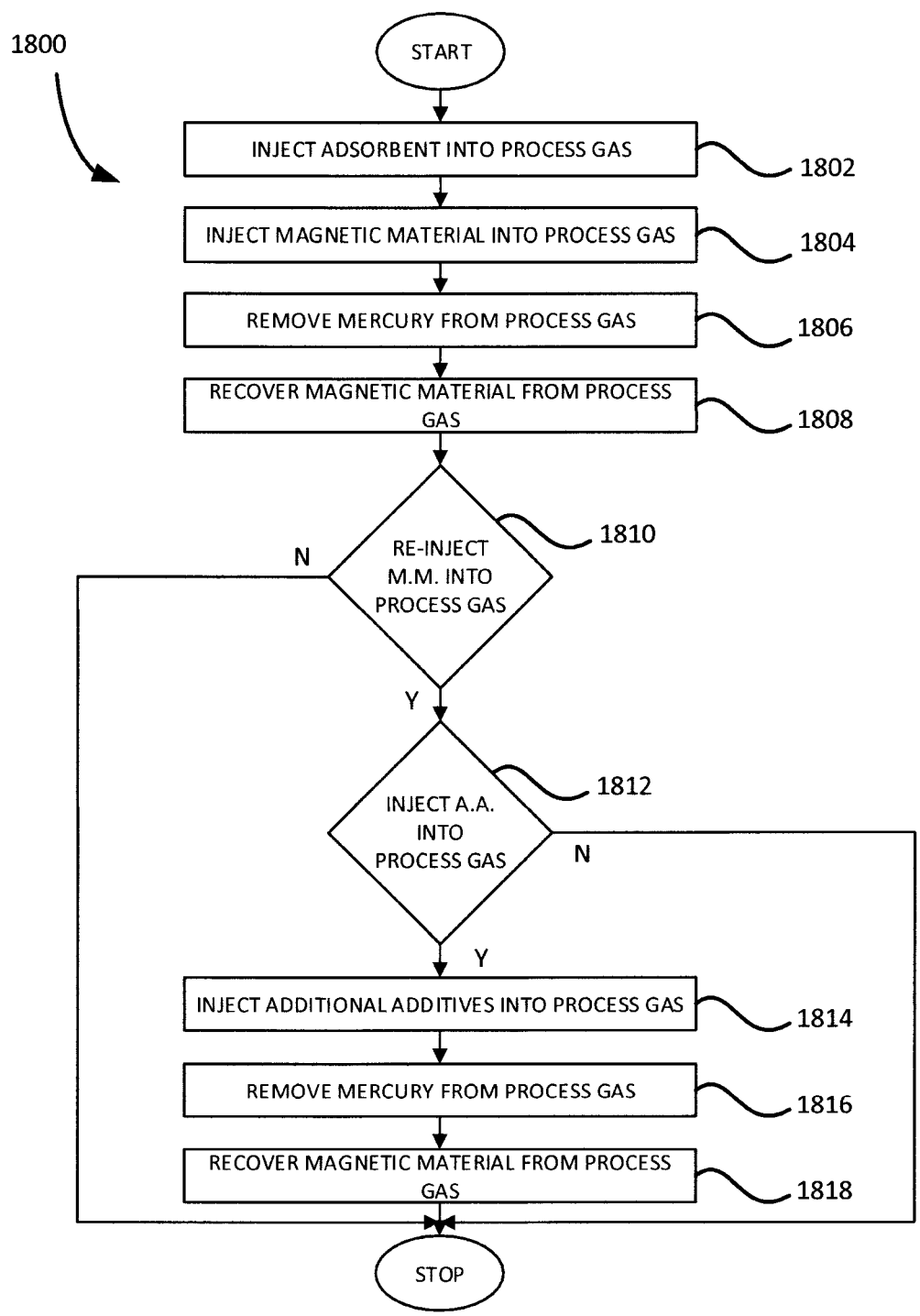
FIG. 18 is a flowchart of a process for removal of contaminants from fluid streams according to another embodiment.

With further reference to FIG. 18, a method for removing mercury or decreasing the mercury concentration in a process stream is schematically illustrated and generally designated 1800. In step 1802, a PAC may be injected into a process stream, such as process gas/fluid stream 1306. In step 1804, a magnetic material may be injected into a process stream, such as process gas/fluid stream 1306. In another embodiment, steps 1802 and 1804 may be reversed or changed around in a different order.

In step 1806, mercury is removed from process gas/fluid stream 1306 by the PAC and magnetic material that were injected in steps 1802 and 1804. In optional step 1808, the magnetic material may be recovered from the process gas/fluid stream 1306 for further use in the method. This step may include using a magnetic material recovery unit, such as magnetic material recovery unit 1326.

In step 1810, an inquiry as to whether to re-inject the recovered magnetic material back into the process stream, such as process gas/fluid stream 1306 is made. If the answer to the inquiry is no, then the process may proceed to the end. If the answer to the inquiry is yes, then in step 1812 another inquiry is made as to whether to inject additional additives as described herein. If the answer to this inquiry is no, then the process may proceed to the end. If the answer to the inquiry is yes, then an additional additive may be injected into the process stream, such as process gas/fluid stream 1306, as shown in step 1814. Step 1814 may further include injecting with the additional additive some of the recovered magnetic material as described above and additional sorbent.

In step 1816, mercury is removed from process gas/fluid stream 1306 by the components that were injected in the previous steps. In step 1818, the magnetic material may be recovered from the process gas/fluid stream 1306 for further use in the method. This step may include using a magnetic material recovery unit, such as magnetic material recovery unit 1326.

Figure 19:
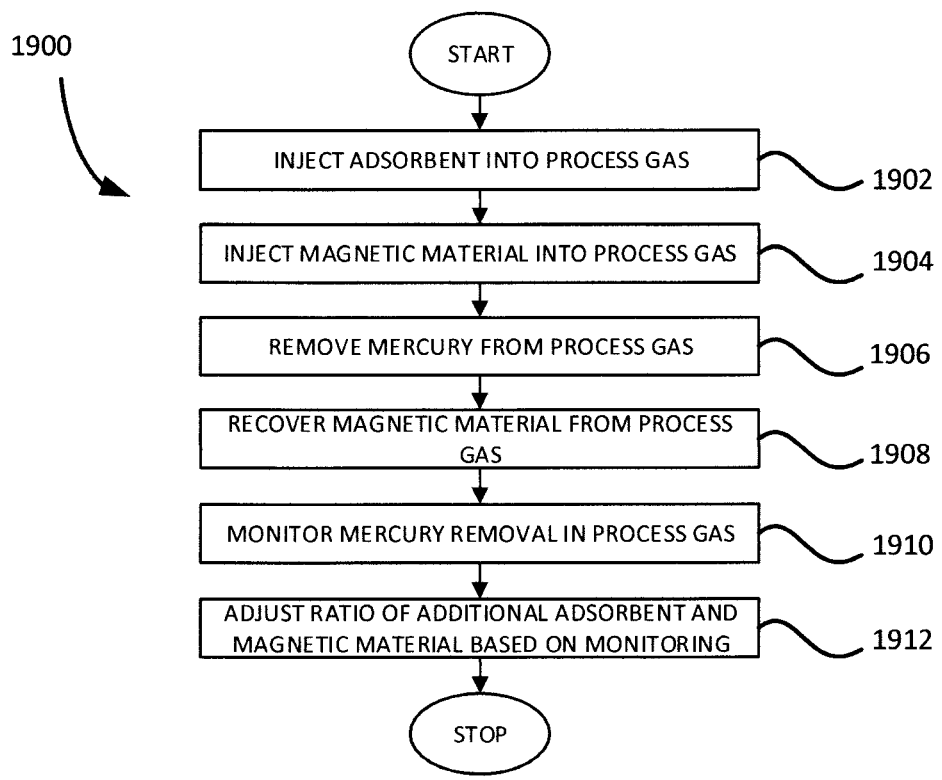
FIG. 19 is a flowchart of a process for removal of contaminants from fluid streams according to another embodiment.

Referring now to FIG. 19, a method for removing mercury or decreasing the mercury concentration in a process stream is schematically illustrated and generally designated 1900. In step 1902, a PAC may be injected into a process stream, such as process gas/fluid stream 1306. In step 1904, a magnetic material may be injected into a process stream, such as process gas/fluid stream 1306. In another embodiment, steps 1902 and 1904 may be reversed or changed around in a different order. In one embodiment, this step may include coating the magnetic material with a liquid additive, such as an oxidizing agent, halide solution, acid solution, base solution, etc. In another embodiment, the PAC may be impregnated with an additive, such as an oxidizing agent, halide solution, acid solution, base solution, etc.

In step 1906, mercury is removed from process gas/fluid stream 1306 by the PAC and magnetic material that were injected in steps 1802 and 1804. In optional step 1908, the magnetic material may be recovered from the process gas/fluid stream 1306 for further use in the method. This step may include using a magnetic material recovery unit, such as magnetic material recovery unit 1326.

In step 1910, a control or monitoring device/unit, such as control unit 1514, monitors the mercury concentration in process gas/fluid stream 1306 upstream of the injection points of the PAC and the magnetic material, such as where sensor 1517 is shown in FIG. 15. Control unit 1514 also monitors the mercury concentration in process gas/fluid stream 1306 downstream of flue gas desulfurization unit, such as flue gas desulfurization unit 1330, such as where sensor 1519 is shown in FIG. 15. In another embodiment, these sensor for monitoring the concentration of mercury may be located in other locations along process lines 1308 and/or process gas/fluid stream 1306 for determining the efficiency of the magnetic sorbent.

In step 1912, the efficiency of mercury removal from process gas/fluid stream 1306 is determined by control unit 1514, and the ratio of PAC to magnetic may be adjusted to increase or decrease the injection rates of the PAC and/or magnetic material for optimizing the method.

Figure 20:
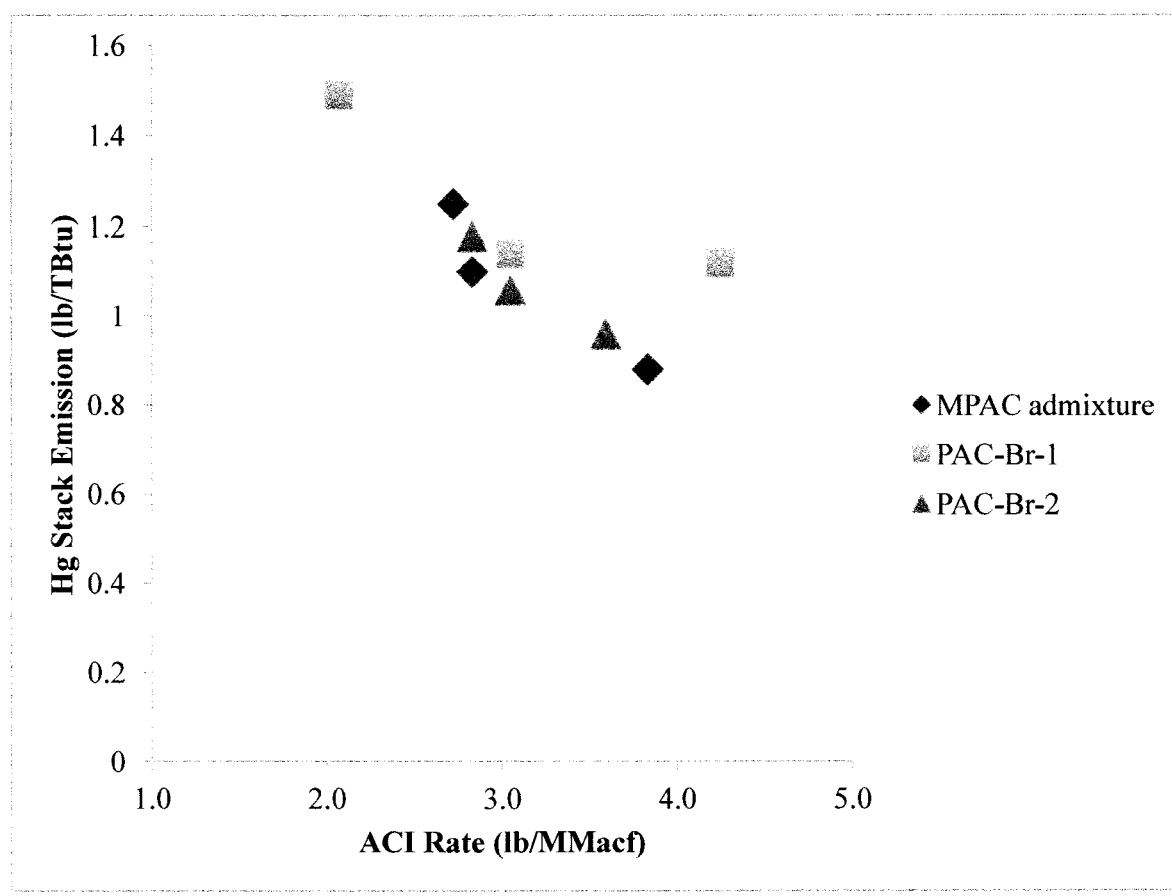
FIG. 20 is a plot of results of a magnetic adsorbent according to the present invention versus two typical brominated magnetic powdered activated carbon samples and their respective efficiency in removing mercury from a fluid stream.

FIG. 20 is a plot of results of a magnetic adsorbent according to the present invention versus two typical brominated magnetic powdered activated carbon samples and their respective efficiency in removing mercury from a fluid stream. Testing was conducted at a 175 MW facility burning Powder River Basin coal. Pollution controls include a cold-side electrostatic precipitator and wet flue gas desulfurization unit. The injection of the magnetic adsorbent occurred prior to the electrostatic precipitator and post air heater. The magnetic adsorbent admixture was composed of a powdered activated carbon and 10% by weight, magnetic material admixture. The other two samples are typical brominated MPACs.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A magnetic adsorbent for the capture of mercury from flue gas of coal combustion devices, said magnetic absorbent, comprising:
   an activated carbon adsorbent;
   an iron oxide forming a magnetic portion wherein magnetic activity of the magnetic portion is not blocked by the activated carbon, said magnetic portion being implanted on a surface of the activated carbon;
   an additive including a photocatalyst and a halogen;
   a binder;
   a first additional additive including one or more of the group consisting of a magnetic sorbent, magnetic particles, and a magnetic catalyst;
   wherein said iron oxide and said additive are implanted onto a surface of the adsorbent;
   wherein said halogen enhances oxidation of the mercury in a contaminated stream of the flue gas when said magnetic adsorbent is placed into contact with said contaminated stream; and
   wherein said iron oxide oxidizes mercury from elemental mercury (Hg) to Mercury Oxide (Hg II).

2. The magnetic adsorbent as recited in claim 1, further comprising:
   an additional additive selected from at least one of the group consisting of sulfides, organosulfides, inorganic sulfides, oxidizing compounds, acids, nitric acid, sulfuric acid, hydrochloric acid, bases, hydroxide salts, metals, metal catalyst, minerals, clays, bentonite, aluminosilicates, silicates.

3. The magnetic adsorbent as recited in claim 2, wherein the additional additive is one of a dry form and a liquid form.

4. The magnetic adsorbent as recited in claim 1, wherein the one or more of the group consisting of the magnetic sorbent, the magnetic particles, and the magnetic catalyst is coated with at least one second additional additive.

5. The magnetic adsorbent as recited in claim 1, wherein:
   said implanted iron oxide has a crystalline structure similar to a crystalline structure of iron oxide in maghemite, hematite, or magnetite that is not heated.

6. The magnetic adsorbent as recited in claim 1, wherein:
   the magnetic portion ratio to total weight of the magnetic adsorbent is from about 1% to about 20%.

7. A magnetic adsorbent for the capture of mercury from flue gas of coal combustion devices, said magnetic absorbent, comprising:
   an activated carbon adsorbent;
   an iron oxide forming a magnetic portion, said magnetic portion being implanted on a
   surface of the activated carbon;
   an additive including a photocatalyst and a halogen;
   a binder;
   an additional additive including one or more of the group consisting of a magnetic sorbent, magnetic particles, and a magnetic catalyst;

wherein said iron oxide and said additive are implanted onto a surface of the adsorbent; and wherein said iron oxide oxidizes mercury from elemental mercury (Hg) to Mercury Oxide (Hg II).

\* \* \* \* \*